US012688452B2

(12) United States Patent
Bonderson et al.

(10) Patent No.: US 12,688,452 B2
(45) Date of Patent: Jul. 21, 2026

(54) DETECTION OF QUASIPARTICLE POISONING AT MAJORANA ISLAND

(71) Applicant: Microsoft Technology Licensing, LLC, Redmond, WA (US)

(72) Inventors: Parsa Bonderson, Santa Barbara, CA (US); David Alexander Aasen, Santa Barbara, CA (US); Roman Bela Bauer, Santa Barbara, CA (US); Christina Paulsen Knapp, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 849 days.

(21) Appl. No.: 18/159,607

(22) Filed: Jan. 25, 2023

(65) Prior Publication Data

US 2024/0249174 A1 Jul. 25, 2024

(51) Int. Cl.
*G06N 10/40* (2022.01)

(52) U.S. Cl.
CPC .................................... *G06N 10/40* (2022.01)

(58) Field of Classification Search
CPC .............................. G06N 10/20; G06N 10/40
See application file for complete search history.

(56) References Cited

U.S. PATENT DOCUMENTS

| | | | | |
|---|---|---|---|---|
| 2017/0091649 | A1* | 3/2017 | Clarke | G06F 15/82 |
| 2018/0053113 | A1* | 2/2018 | Lutchyn | H10N 69/00 |
| 2021/0279627 | A1* | 9/2021 | Bauer | H03M 13/63 |
| 2022/0182027 | A1* | 6/2022 | Reilly | G06N 10/40 |

OTHER PUBLICATIONS

International Search Report and Written Opinion received for PCT Application No. PCT/US2023/036922, Jul. 23, 2025, 13 pages.
Karzig, et al., "Scalable Designs for Quasiparticle-Poisoning-Protected Topological Quantum Computation with Majorana Zero Modes", In Repository of arXiv:1610.05289v4, Jun. 21, 2017, 34 Pages.

* cited by examiner

*Primary Examiner* — Sibin Chen
(74) *Attorney, Agent, or Firm* — Alleman Hall LLP

(57) ABSTRACT

A computing system including a quantum computing device. The quantum computing device includes a Majorana island at which Majorana zero modes (MZMs) are instantiated. The quantum computing device further includes a quantum dot electrically connectable to an MZM, a capacitance sensor capacitively coupled to the quantum dot, and a controller. The controller is configured to set a Majorana island gate voltage of the Majorana island and a quantum dot gate voltage of the quantum dot to a candidate resonance Majorana island voltage and a candidate resonance quantum dot voltage. The controller is further configured to receive a capacitance measurement of the quantum dot and the Majorana island and determine whether resonance occurs based on the capacitance measurement. The controller is further configured to reset the gate voltages. The controller is further configured to output a quasiparticle poisoning value indicated by the one or more determinations of whether resonance occurs.

20 Claims, 15 Drawing Sheets

TO FIG. 8B

FROM FIG. 8A

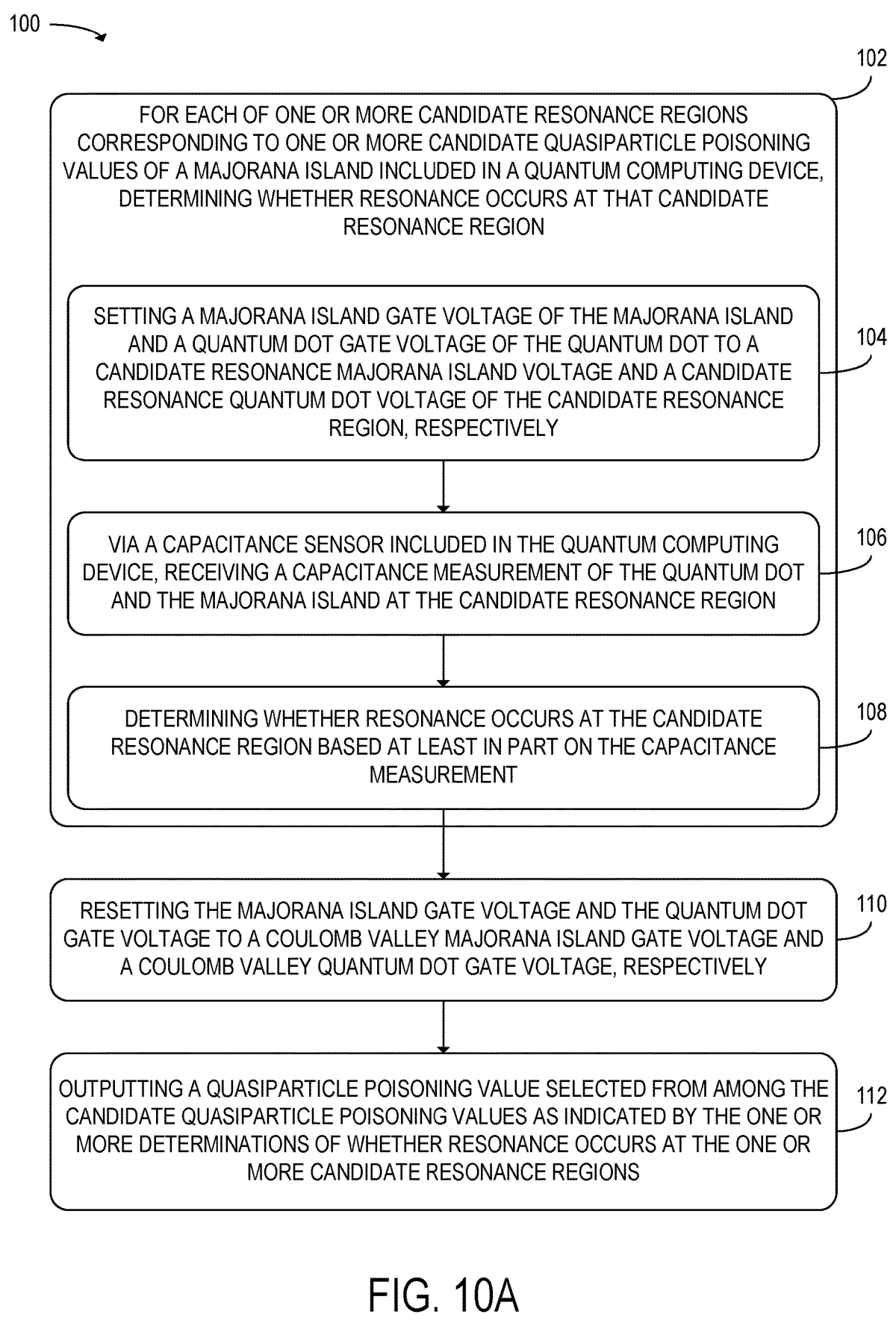

100 —

102

FOR EACH OF ONE OR MORE CANDIDATE RESONANCE REGIONS CORRESPONDING TO ONE OR MORE CANDIDATE QUASIPARTICLE POISONING VALUES OF A MAJORANA ISLAND INCLUDED IN A QUANTUM COMPUTING DEVICE, DETERMINING WHETHER RESONANCE OCCURS AT THAT CANDIDATE RESONANCE REGION

104

SETTING A MAJORANA ISLAND GATE VOLTAGE OF THE MAJORANA ISLAND AND A QUANTUM DOT GATE VOLTAGE OF THE QUANTUM DOT TO A CANDIDATE RESONANCE MAJORANA ISLAND VOLTAGE AND A CANDIDATE RESONANCE QUANTUM DOT VOLTAGE OF THE CANDIDATE RESONANCE REGION, RESPECTIVELY

106

VIA A CAPACITANCE SENSOR INCLUDED IN THE QUANTUM COMPUTING DEVICE, RECEIVING A CAPACITANCE MEASUREMENT OF THE QUANTUM DOT AND THE MAJORANA ISLAND AT THE CANDIDATE RESONANCE REGION

108

DETERMINING WHETHER RESONANCE OCCURS AT THE CANDIDATE RESONANCE REGION BASED AT LEAST IN PART ON THE CAPACITANCE MEASUREMENT

110

RESETTING THE MAJORANA ISLAND GATE VOLTAGE AND THE QUANTUM DOT GATE VOLTAGE TO A COULOMB VALLEY MAJORANA ISLAND GATE VOLTAGE AND A COULOMB VALLEY QUANTUM DOT GATE VOLTAGE, RESPECTIVELY

112

OUTPUTTING A QUASIPARTICLE POISONING VALUE SELECTED FROM AMONG THE CANDIDATE QUASIPARTICLE POISONING VALUES AS INDICATED BY THE ONE OR MORE DETERMINATIONS OF WHETHER RESONANCE OCCURS AT THE ONE OR MORE CANDIDATE RESONANCE REGIONS

FIG. 10A

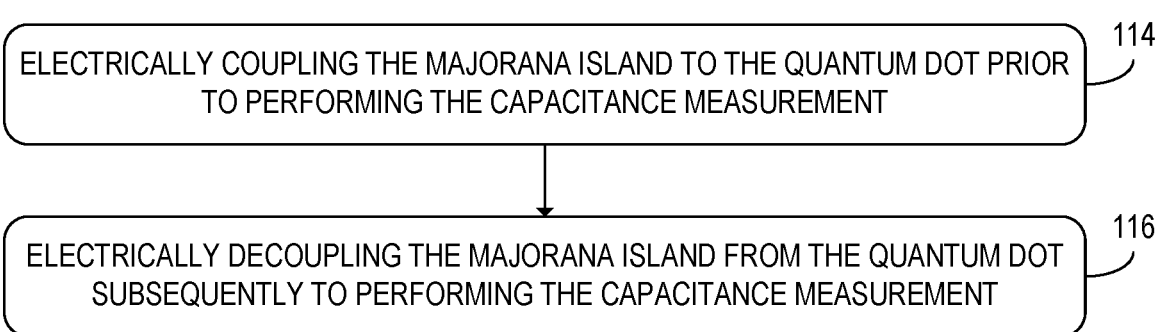

ELECTRICALLY COUPLING THE MAJORANA ISLAND TO THE QUANTUM DOT PRIOR TO PERFORMING THE CAPACITANCE MEASUREMENT 114

ELECTRICALLY DECOUPLING THE MAJORANA ISLAND FROM THE QUANTUM DOT SUBSEQUENTLY TO PERFORMING THE CAPACITANCE MEASUREMENT 116

FIG. 10B

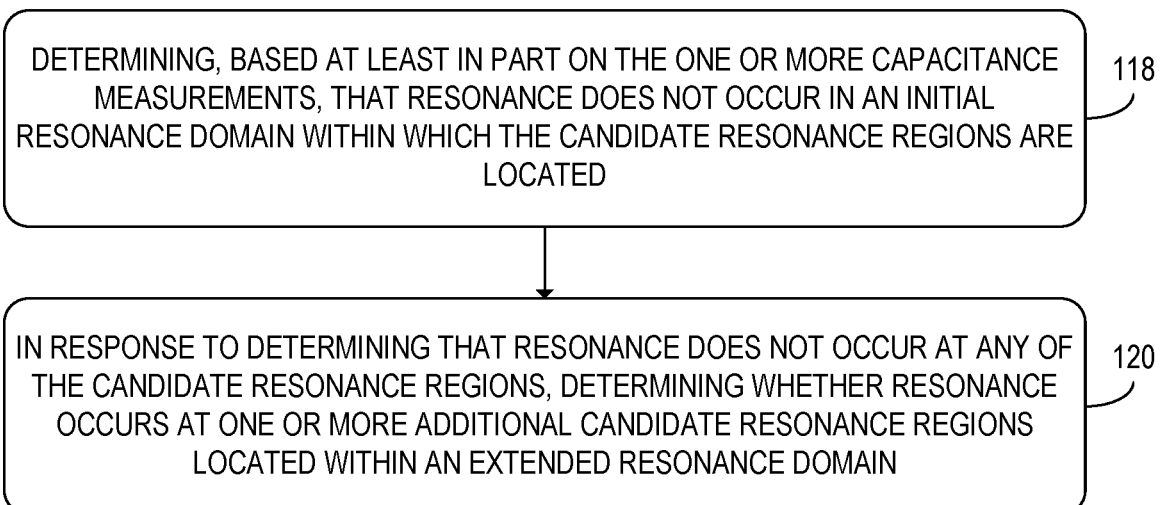

DETERMINING, BASED AT LEAST IN PART ON THE ONE OR MORE CAPACITANCE MEASUREMENTS, THAT RESONANCE DOES NOT OCCUR IN AN INITIAL RESONANCE DOMAIN WITHIN WHICH THE CANDIDATE RESONANCE REGIONS ARE LOCATED 118

IN RESPONSE TO DETERMINING THAT RESONANCE DOES NOT OCCUR AT ANY OF THE CANDIDATE RESONANCE REGIONS, DETERMINING WHETHER RESONANCE OCCURS AT ONE OR MORE ADDITIONAL CANDIDATE RESONANCE REGIONS LOCATED WITHIN AN EXTENDED RESONANCE DOMAIN 120

FIG. 10C

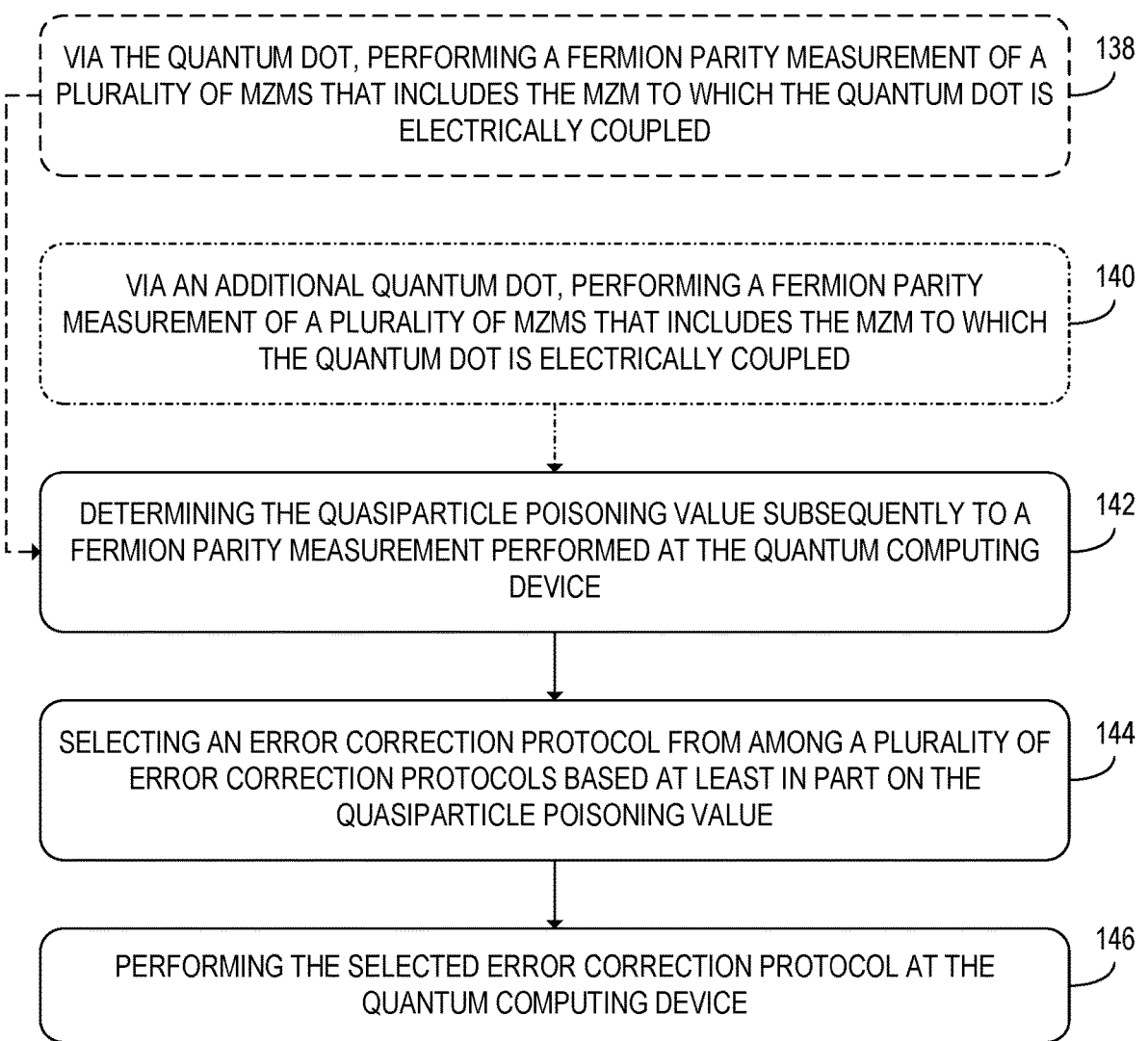

VIA THE QUANTUM DOT, PERFORMING A FERMION PARITY MEASUREMENT OF A PLURALITY OF MZMS THAT INCLUDES THE MZM TO WHICH THE QUANTUM DOT IS ELECTRICALLY COUPLED — 138

VIA AN ADDITIONAL QUANTUM DOT, PERFORMING A FERMION PARITY MEASUREMENT OF A PLURALITY OF MZMS THAT INCLUDES THE MZM TO WHICH THE QUANTUM DOT IS ELECTRICALLY COUPLED — 140

DETERMINING THE QUASIPARTICLE POISONING VALUE SUBSEQUENTLY TO A FERMION PARITY MEASUREMENT PERFORMED AT THE QUANTUM COMPUTING DEVICE — 142

SELECTING AN ERROR CORRECTION PROTOCOL FROM AMONG A PLURALITY OF ERROR CORRECTION PROTOCOLS BASED AT LEAST IN PART ON THE QUASIPARTICLE POISONING VALUE — 144

PERFORMING THE SELECTED ERROR CORRECTION PROTOCOL AT THE QUANTUM COMPUTING DEVICE — 146

FIG. 10E

DETECTION OF QUASIPARTICLE POISONING AT MAJORANA ISLAND

BACKGROUND

Majorana-based quantum computing is an approach to quantum computing that utilizes Majorana zero modes (MZMs). The MZMs are instantiated at floating superconducting regions of a quantum computing device. When two or more MZMs are formed at a floating superconducting region, that superconducting region is known as a Majorana island. The parities of the MZMs included in the Majorana island may be used to store qubits and classical bits that are used in quantum computations.

SUMMARY

According to one aspect of the present disclosure, a computing system is provided, including a quantum computing device. The quantum computing device includes a Majorana island at which a plurality of Majorana zero modes (MZMs) are instantiated. The quantum computing device further includes a quantum dot electrically connectable to an MZM of the plurality of MZMs. The quantum computing device further includes a capacitance sensor capacitively coupled to the quantum dot. The quantum computing device further includes a controller configured to, for each of one or more candidate resonance regions corresponding to one or more candidate quasiparticle poisoning values, determine whether resonance occurs at that candidate resonance region. The controller is configured to determine whether resonance occurs at least in part by setting a Majorana island gate voltage of the Majorana island and a quantum dot gate voltage of the quantum dot to a candidate resonance Majorana island voltage and a candidate resonance quantum dot voltage of the candidate resonance region, respectively. Determining whether resonance occurs further includes, via the capacitance sensor, receiving a capacitance measurement of the quantum dot and the Majorana island at the candidate resonance region. The controller is further configured to determine whether resonance occurs at the candidate resonance region based at least in part on the capacitance measurement. The controller is further configured to reset the Majorana island gate voltage and the quantum dot gate voltage to a Coulomb valley Majorana island gate voltage and a Coulomb valley quantum dot gate voltage, respectively. The controller is further configured to output a quasiparticle poisoning value selected from among the candidate quasiparticle poisoning values as indicated by the one or more determinations of whether resonance occurs at the one or more candidate resonance regions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10A shows a flowchart of a quasiparticle poisoning detection method for use with a computing system that includes a quantum computing device and a controller, according to the example of FIG. 1.

FIGS. 10B-10E show additional steps of the method of FIG. 10A that may be performed in some examples.

DETAILED DESCRIPTION

Figure 1:
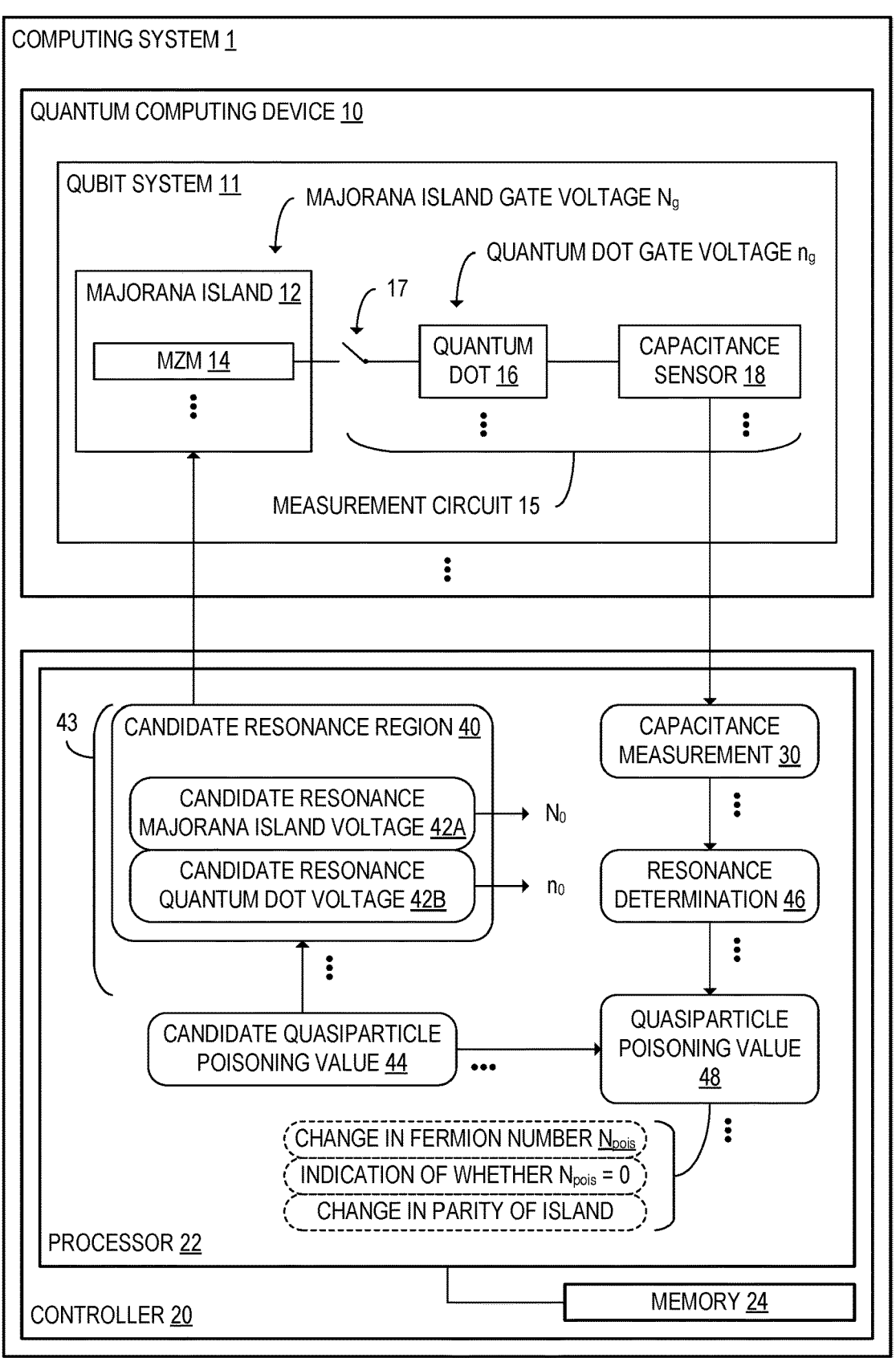
FIG. 1 schematically shows, according to one example embodiment, a computing system including a quantum computing device and a controller, where the quantum computing device includes an island-dot system that includes a Majorana island and a quantum dot.

Each Majorana island included in a Majorana-based quantum computing device may be a coherent link that includes two MZMs, a tetron that includes four MZMs, or a hexon that includes six MZMs. A classical bit may be encoded at a coherent link, and a qubit may be encoded at a tetron or a hexon. The ground states of a Majorana island that includes $2n$ MZMs exhibits $2^{n-1}$-fold degeneracy, which allows quantum information to be stored in the ground states of the Majorana island. Measurement-based operations may be performed on a qubit instantiated at a Majorana-based quantum computing device to perform quantum computations. The measurement-based operations may be performed by coupling pairs of MZMs included in the same or different Majorana islands using quantum dots (QDs) adjacent to the Majorana islands. The pairs of MZMs, when coupled, define non-self-intersecting loops that allow coherent single-electron transport between the pairs. The total energy of the linked system of MZMs depends upon the collective fermion parity of the MZMs. This parity may be measured by connecting an MZM or a QD to a readout circuit.

Topological protection is a property of Majorana-based qubits that has prompted interest in using Majorana-based qubits in quantum computing platforms. Topological protection refers to the exponential suppression of errors as a function of the macroscopic energy ratios of a Majorana-based qubit system. This exponential suppression applies to three sources of errors that may occur at the Majorana island: residual energy splitting between MZMs; intrinsic quasiparticle poisoning of the Majorana island; and addition or removal of electrons to or from a Majorana island tuned to a Coulomb valley. The suppression of residual energy splitting is given by a factor of $e^{-L/\xi}$, where L is a distance separating the MZMs and $\xi$ is a topological correlation length. Intrinsic quasiparticle poisoning occurs when quasiparticles are excited above a superconducting gap $\Delta$ of the superconductor. The suppression of intrinsic quasiparticle poisoning is given by a factor of $e^{-\Delta/k_B T}$, where $k_B$ is the Boltzmann constant and T is temperature. The suppression of addition or removal of electrons is given by a factor of $e^{-E_c/k_B T}$, where $E_c$ is a charging energy. Thus, errors may be less likely to occur at Majorana-based qubits than at other types of qubits.

Quasiparticle poisoning (QPP) is discussed in additional detail below. QPP is a type of error that changes the fermion parity of a Majorana island and may thereby produce errors in a quantum computation. There are three types of QPP that occur at Majorana-based quantum computing devices: intrinsic QPP, extrinsic QPP, and inter-component QPP.

Intrinsic QPP is QPP that occurs when the fermion number of a Majorana island remains constant, but the ground states of the Majorana island are thermally excited above the superconducting gap $\Delta$. Thus, states with localized quasiparticles occur in the bulk of the Majorana island. In a hard gap superconductor, intrinsic QPP occurs when a ground state of a Majorana island is excited above the superconducting gap $\Delta$ to form a state that includes a localized bulk quasiparticle. The quasiparticle is expelled from the MZM and is typically absorbed by an MZM, resulting in the relaxation of the Majorana island back into the ground state subspace. The emitter MZM and the absorber MZM may be different MZMs. Thus, the ground state of the MZM system may change when the quasiparticle is emitted and absorbed. This change in the ground state may lead to an error in a quantum computation due to the transfer of fermions between the emitter and absorber MZMs.

Extrinsic QPP is QPP that occurs when the Majorana island exchanges fermions with a fermion source outside the system of Majorana qubits and qubit-measurement components (QDs and coherent links). Extrinsic QPP may, for example, occur as a result of quasiparticle leakage from neighboring electrostatic gates or transport leads included in the quantum computing device. The lowest-energy process that changes the fermion number on the Majorana island is the absorption or emission of a fermion at the island via an MZM. Thus, quasiparticle leakage from components outside the system of Majorana qubits and measurement components typically affects the information encoded in a qubit, thereby resulting in an error in a quantum computation.

Inter-component QPP occurs when a Majorana island exchanges a fermion with another component of the qubit system, which may be another Majorana island or a QD. Similarly to extrinsic QPP, inter-component QPP typically occurs when a fermion enters or leaves the Majorana island via an MZM. Accordingly, inter-component QPP also typically results in an error. Inter-component QPP may, for example, occur during a decoupling step of a measurement when a Majorana island is disconnected from one or more other components of the qubit system.

As discussed above, inter-component QPP may be suppressed by increasing the charging energy $E_c$ of the Majorana island. However, subsequently to inter-component QPP occurring, the poisoning quasiparticle may have a high probability of moving to other Majorana islands during subsequent measurements. This probability approaches $(n-1)/n$ for a measurement performed on n Majorana islands that have the same dimensions. In such an n-island measurement, the additional fermion has the same energy cost to move to each of the Majorana islands that are linked during the measurement. When the distribution of fermions across the linked Majorana islands is imbalanced, the fermions have a high probability of moving into a state that equalizes the fermion numbers of the Majorana islands. The charging energies of the QDs included in the qubit system are typically much higher than the charging energies of the Majorana islands. Thus, inter-component QPP between Majorana islands is typically the highest-probability form of inter-component QPP.

Using the devices and methods discussed below, QPP may be detected at a Majorana-based quantum computing device. FIG. 1 schematically shows a computing system 1 including a quantum computing device 10 and a controller 20. The quantum computing device 10 and the controller 20 are communicatively coupled such that the controller 20 is configured to receive inputs from, and transmit output instructions to, the quantum computing device 10. The controller 20 may, for example, be a classical computing device that includes a processor 22 and memory 24, as shown in the example of FIG. 1.

The quantum computing device 10 includes one or more island-dot systems 11. Each of the island-dot systems 11 includes a Majorana island 12 at which a plurality of Majorana zero modes (MZMs) 14 are instantiated. The Majorana island 12 may be a coherent link, a Majorana tetron, or a Majorana hexon.

The island-dot system 11 further includes a measurement circuit 15, which includes a quantum dot 16 electrically connectable to an MZM 14 of the plurality of MZMs 14. The quantum dot 16 may be coupled to and decoupled from the MZM 14 by closing and opening a switch 17 included in the measurement circuit 15. The measurement circuit 15 further includes a capacitance sensor 18 capacitively coupled to the quantum dot 16. As discussed in further detail below, the capacitance sensor 18 is configured to transmit a plurality of capacitance measurements 30 to the controller 20. For example, the capacitance sensor 18 may be a dispersive gate sensor configured to obtain the capacitance measurement 30 via dispersive gate sensing. In other examples, some other type of capacitance sensor 18 may be included in the measurement circuit 15. For example, the capacitance sensor 18 may instead be configured to perform energy level spectroscopy or quantum dot charge sensing in other examples. The plurality of capacitance measurements 30 may be indirect measurements of a thermally averaged quantum capacitance of the Majorana island 12 and the quantum dot 16.

By opening and closing the switch 17, the controller 20 may be configured to prevent capacitance measurements 30 from changing a qubit state of the Majorana island 12. The controller 20 may be configured to electrically couple the Majorana island 12 to the quantum dot 16 prior to performing the capacitance measurement 30. In addition, the controller 20 may be further configured to electrically decouple the Majorana island 12 from the quantum dot 16 subsequently to performing the capacitance measurement 30. Thus, the Majorana island 12 may be electrically isolated from the capacitance sensor 18 when the capacitance measurement 30 is not being performed.

At the island-dot system 11, a Majorana island gate voltage $N_g$ and a quantum dot gate voltage $n_g$ are respectively applied to the Majorana island 12 and the quantum dot 16. Depending upon the values of the Majorana island gate voltage $N_g$ and the quantum dot gate voltage $n_g$, the capacitance sensor 18 measures different capacitance values for the island-dot system 11. The values of these capacitance measurements 30 are used to detect QPP at the Majorana island 12, as discussed below.

Figure 2:
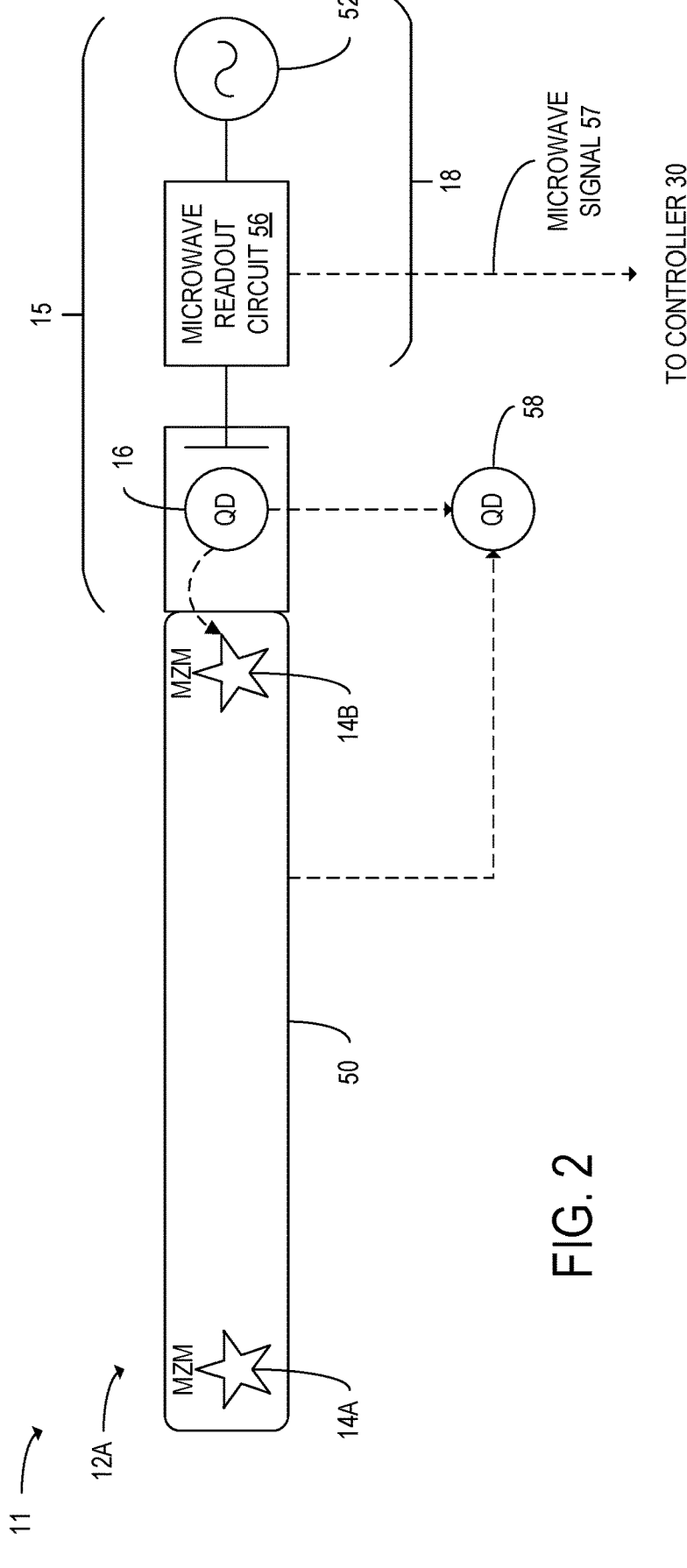
FIG. 2 shows an example configuration of the island-dot system in which the Majorana island is a coherent link, according to the example of FIG. 1.

FIG. 2 shows an example configuration of the island-dot system 11 in which the Majorana island 12 is a coherent link 12A. The coherent link 12A includes a first MZM 14A and a second MZM 14B that form at respective ends of a topological superconducting nanowire 50. In the example of FIG. 2, the QD 16 is electrically connectable to the second MZM 14B. The capacitance sensor 18 in the example of FIG. 2 is configured to measure the capacitance between the QD 16 and an alternating current (AC) voltage source 52.

In the example of FIG. 2, the capacitance sensor 18 includes a microwave readout circuit 56 that is electrically coupled to the AC voltage source 52 and capacitively coupled to the QD 16. The microwave readout circuit 56 is configured to generate a microwave signal based at least in part on a capacitance of the quantum dot 16 and the Majorana island 12. For example, the microwave readout circuit 56 may be an LC circuit at which the capacitance of the QD 16 and the Majorana island 12 affect a resonant frequency of the microwave readout circuit 56. Thus, a value of the capacitance may be determined from the microwave signal. The microwave signal, in the example of FIG. 2, is output to the controller 20 as the capacitance measurement 30.

In the example of FIG. 2, the quantum dot 16 that is used to obtain the capacitance measurements 30 is also used to perform measurements included in quantum computations. Via the quantum dot 16, the quantum computing device 10 is further configured to perform a fermion parity measurement of a plurality of MZMs 14 that includes the MZM 14B to which the quantum dot 16 is electrically coupled. Since each fermion parity measurement is of an even number of MZMs 14, the fermion parity measurement is also performed on at least one other MZM 14. The QD 16 may accordingly serve a dual purpose, thereby allowing the capacitance measurements 30 to be collected without increasing the number of QDs 16 used in the island-dot system 11. Increases in the size and manufacturing complexity of the island-dot system 11 may consequently be avoided by using the same QD 16 for capacitance measurements 30 and fermion parity measurements.

FIG. 2 further shows a fermion reservoir 58, which is an additional quantum dot in this example. As discussed in further detail below, the respective fermion numbers of the Majorana island 12 and the QD 16 may be modified by electrically coupling the Majorana island 12 and the QD 16 to the fermion reservoir 58. For example, the Majorana island 12 or the QD 16 may be electrically coupled to the fermion reservoir 58 during device calibration to reset its respective fermion number to zero.

Figure 3:
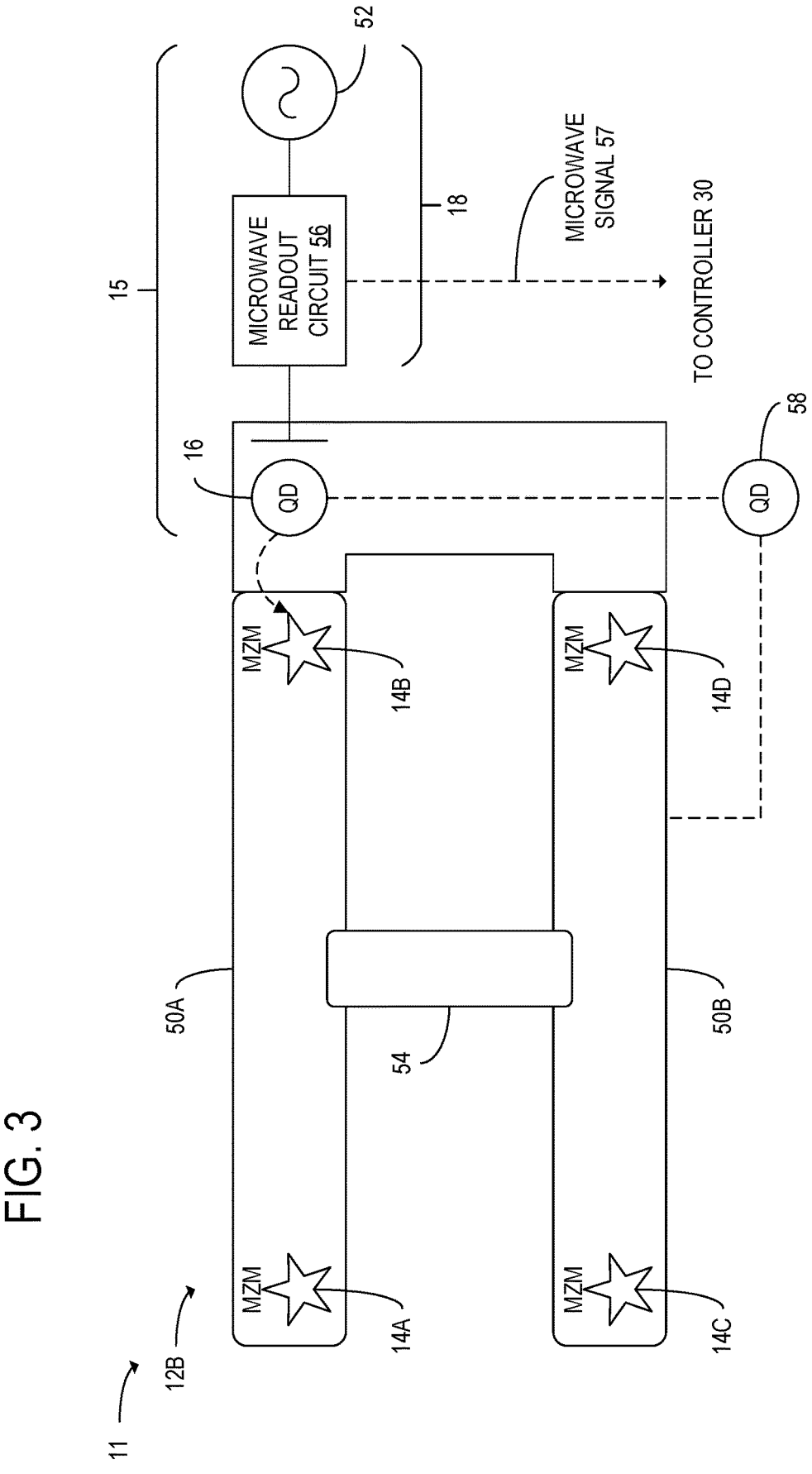
FIG. 3 shows an example configuration of the island-dot system in which the Majorana island is a Majorana tetron, according to the example of FIG. 1.

FIG. 3 shows an example configuration of the island-dot system 11 in which the Majorana island 12 is a Majorana tetron 12B. The Majorana tetron 12B includes a first MZM 14A, a second MZM 14B, a third MZM 14C, and a fourth MZM 14D. The first MZM 14A and the second MZM 14B are located at the ends of a first topological superconducting nanowire 50A, and the third MZM 14C and the fourth MZM 14D are located at the ends of a second topological superconducting nanowire 50B. The first topological superconducting nanowire 50A and the second topological superconducting nanowire 50B are coupled by a trivial superconducting nanowire 54.

Figure 4:
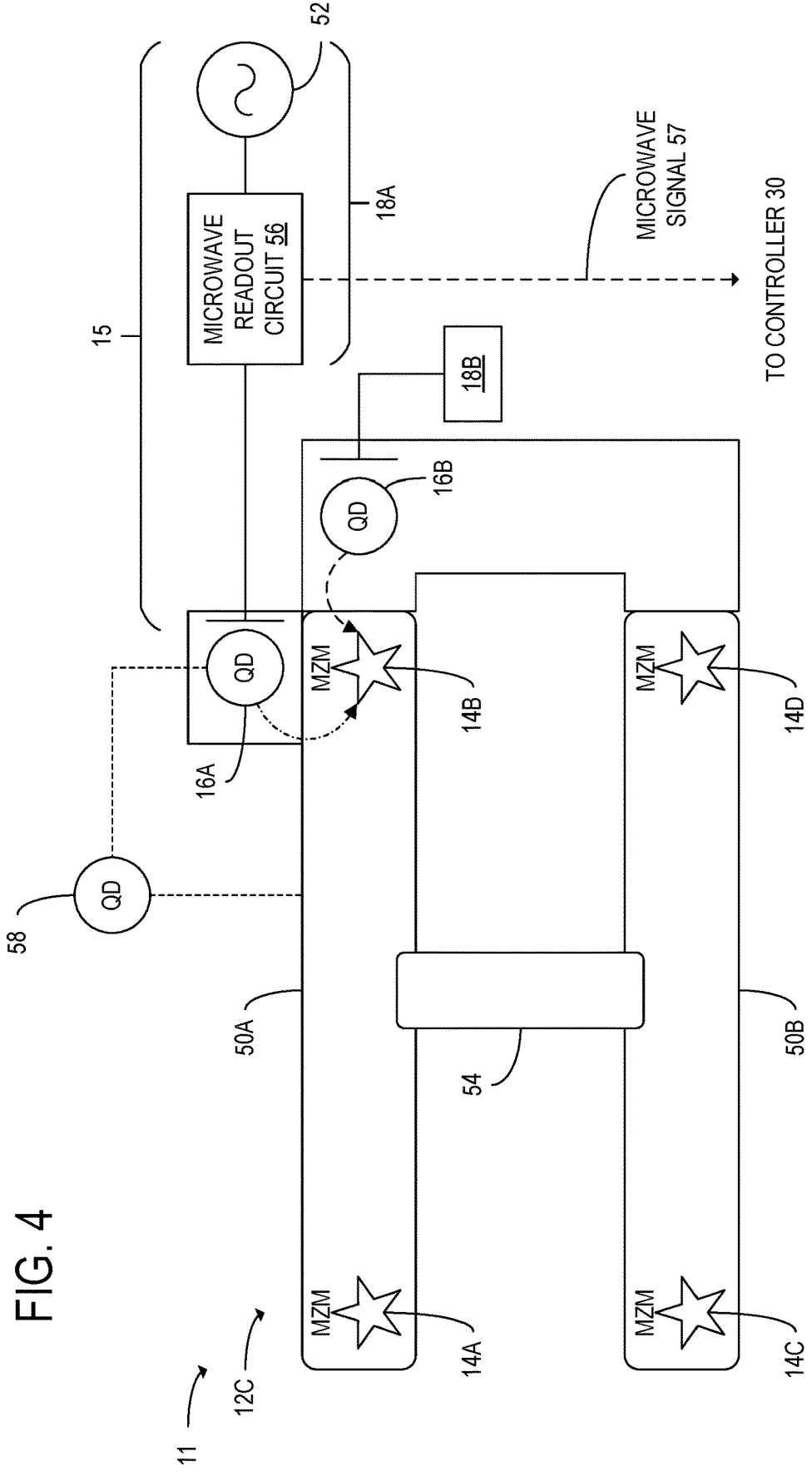
FIG. 4 shows an example configuration of the island-dot system in which the Majorana island is a Majorana tetron to which a first quantum dot and a second quantum dot are electrically connectable, according to the example of FIG. 1.

As an alternative to using the same QD 16 for both Majorana island fermion number measurements 30 and MZM fermion parity measurements, separate QDs may be used, as shown in the example of FIG. 4. FIG. 4 shows the island-dot system 11 in an example in which the Majorana island 12 is a Majorana tetron 12C to which a first QD 16A and a second QD 16B are electrically connectable. In the example of FIG. 4, the first QD 16A and the second QD 16B are both electrically connectable to the second MZM 14B. Thus, the second QD 16B functions as an additional quantum dot via which the quantum computing device 10 is configured to perform a fermion parity measurement of a plurality of MZMs including the MZM 14B and at least one other MZM 14. In the example of FIG. 4, the capacitance sensor that is capacitively coupled to the first QD 16A is a first capacitance sensor 18A. A second capacitance sensor 18B may also be capacitively coupled to the second QD 16B, as shown in the example of FIG. 4. The second capacitance sensor 18B may, for example, include an additional microwave readout circuit.

Using a first QD 16A and a second QD 16B for Majorana island fermion number measurements 30 and MZM fermion parity measurements, respectively, rather than the same QD 16, may allow different QD sizes to be used in the different types of measurements. For example, the size of the second QD 16B may have a lower bound that depends upon the physical layout of the island-dot system 11. However, when a separate first QD 16A is used to perform capacitance measurements 30, the first QD 16A may have a size below this lower bound. Decreasing the size of the first QD 16A may increase the charging energy of the first QD 16A, thereby reducing the probability of intercomponent QPP.

Figure 5:
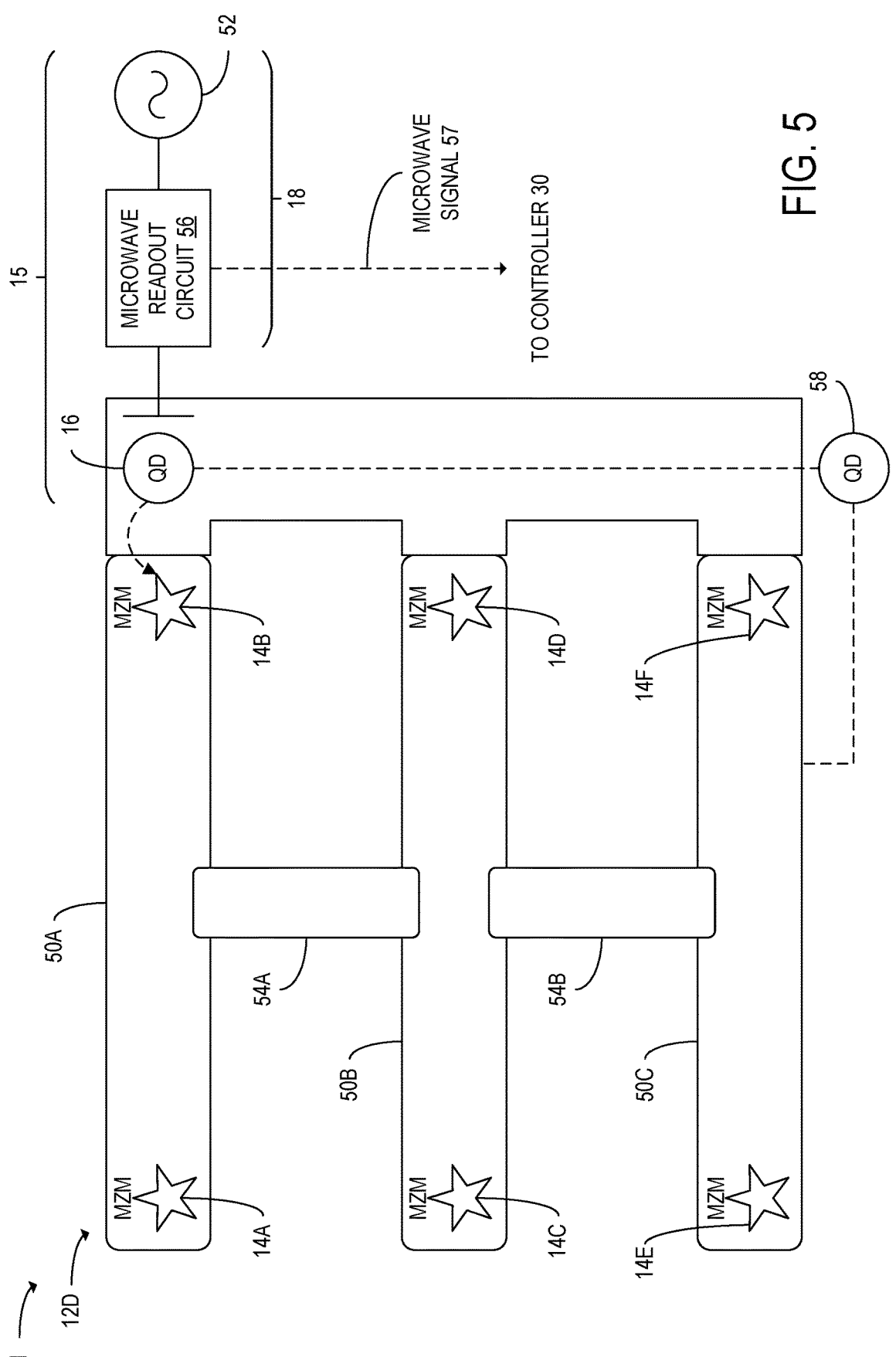
FIG. 5 shows an example configuration of the island-dot system in which the Majorana island is a Majorana hexon, according to the example of FIG. 1.

FIG. 5 shows an example configuration of the island-dot system 11 in which the Majorana island 12 is a Majorana hexon 12D. The Majorana hexon 12D shown in FIG. 5 includes a first MZM 14A, a second MZM 14B, a third MZM 14C, a fourth MZM 14D, a fifth MZM 14E, and a sixth MZM 14F. The first MZM 14A and the second MZM 14B are located at the ends of a first topological superconducting nanowire 50A, the third MZM 14C and the fourth MZM 14D are located at the ends of a second topological superconducting nanowire 50B, and the fifth MZM 14E and the sixth MZM 14F are located at the ends of a third topological superconducting nanowire 50C. The first topological superconducting nanowire 50A is coupled to the second topological superconducting nanowire 50B by a first trivial superconducting nanowire 54A, and the second topological superconducting nanowire 50B is coupled to the third topological superconducting nanowire 50C by a second trivial superconducting nanowire 54B.

Formalism related to the QPP detection is now provided. The Hamiltonian of the Majorana island 12 and the QD 16 may be written as follows:

$$H = H_C + H_t$$

$$H_C = E_C(\hat{N} - N_g)^2 + \varepsilon_C(\hat{n} - n_g)^2$$

$$H_t = t f^\dagger \Gamma_j + h.c.$$

$H_C$ and $H_t$ are a charging component and a tunneling component of the Hamiltonian H. In the above equations, $E_C$ and $\varepsilon_C$ are respective geometric charging energies of the Majorana island 12 and the QD 16, $\hat{N}$ and $\hat{n} = f^\dagger f$ are the respective number operators of the Majorana island 12 and the QD 16, and $N_g$ and $n_g$ are respective dimensionless gate voltages of the Majorana island 12 and the QD 16. The number operators and gate voltages $\hat{N}$, $\hat{n}$, $N_g$, and $n_g$ may be defined with reference to common reference values $N_0$ and no. Defining the common reference values $N_0$ and $n_0$ allows the equations below to be expressed in terms of integers $0, \pm1, \pm2, \ldots$, instead of total numbers of fermions on the Majorana island 12 and quantum dot 16. N=0 indicates a fermion number of the Majorana island 12 when the Majorana island 12 has the reference voltage No, which is a Coulomb valley Majorana island gate voltage. Similarly, n=0 indicates a fermion number of the QD 16 when the QD 16 has the reference voltage $n_0$, which is a Coulomb valley QD gate voltage. The Coulomb valley Majorana island gate voltage $N_0$ and the Coulomb valley QD gate voltage $n_0$ are ground state voltages. In the above equations, $\Gamma_j$ is the charge-conserving Majorana operator $\Gamma_j = e^{-i\phi/2}\gamma_j$ where $\gamma_j$ is the MZM via which the Majorana island 12 is coupled to the QD 16, and t is a tunnel coupling strength between the Majorana island 12 and the QD 16.

According to the following examples, the degeneracy of the lowest energy levels of $H_C$ is modeled in a plurality of charge sectors N+n when the gate voltages are set to $$N_g = \frac{1}{2}$$

and $$n_g = \frac{-1}{2}.$$

In these examples, $\varepsilon_C \gg E_C$ and the ground state energy is given by $$E_0 = \frac{1}{4}(E_C + \varepsilon_C).$$

In a first example, N+n=−1. In this example, the island-dot system 11 has a single ground state at energy $E_0$ for N=0, n=−1. The island-dot system 11 further has a state at energy $E_0 + 2E_C$ for N=−1 and n=0, and has a state at $E_0 + 2\varepsilon_C$ for N=1 and n=−2.

In a second example, N+n=0. In this example, the island-dot system 11 has degenerate ground states at energy $E_0$ for N=0, n=0 and for N=1, n=−1. The island-dot system 11 further has states at energy $E_0 + 2E_C + 2\varepsilon_C$ for N=−1, n=1 and N=2, n=−2.

In a third example, N+n=1. In this example, the island-dot system 11 has a single ground state at energy $E_0$ for N=1, n=0. The island-dot system 11 further has a state at energy $E_0 + 2E_C$ for N=2, n=−1 and a state at energy $E_0 + 2\varepsilon_C$ for N=0, n=1.

When a tunnel coupling t between the Majorana island 12 and the QD 16 is turned on, avoided crossings open at the degenerate states. Thus, the respective eigenvalues of the degenerate states differ, and the difference between the eigenvalues varies as a function of the tunnel coupling strength t. The curvature of the avoided crossings affects the capacitance of the island-dot system 11. Since the island-dot system 11 has a low density of allowed energy levels, the capacitance of the island-dot system 11 is a quantum capacitance that depends upon the gap between the eigenvalues of the Hamiltonian H. The quantum capacitance is maximized when the avoided crossing occurs between the lowest-energy states of the island-dot system 11. Thus, the lowest-energy states behave as a resonance point.

In the example in which $$N_g = \frac{1}{2}$$

and $$n_g = \frac{-1}{2},$$

the island-dot system 11 exhibits resonance at its ground states when N+n=0. However, when QPP occurs, such that N+n≠0, the ground states of the island-dot system 11 are no longer resonance points. When N+n≠0, the curvature of the avoided crossings in the ground state is reduced, resulting in decreased quantum capacitance relative to the N+n=0 case.

For values of the Majorana island gate voltage $N_g$ and the quantum dot gate voltage $n_g$ near $$N_g = \frac{1}{2}$$

and $$n_g = \frac{-1}{2}$$

when N+n=0, the Hamiltonian H is projected into a low-energy state space spanned by $|N,n\rangle = |1,-1\rangle$, $|0,0\rangle$. The Hamiltonian H may be modeled as the following effective Hamiltonian:

$$H^{(N+n=0)} = \begin{pmatrix} -E_C\left(N_g - \frac{1}{2}\right) + \varepsilon_C\left(n_g + \frac{1}{2}\right) & t \\ t & E_C\left(N_g - \frac{1}{2}\right) - \varepsilon_C\left(n_g + \frac{1}{2}\right) \end{pmatrix} = \frac{\delta}{2}\sigma_z + t\sigma_x$$

In the above equation, $\delta$ is an island-QD charging energy difference given by:

$$\delta = -2E_C\left(N_g - \frac{1}{2}\right) + 2\varepsilon_C\left(n_g + \frac{1}{2}\right)$$

$\sigma_z$ is the Pauli z matrix and $\sigma_x$ is the Pauli x matrix. In the above equation for the effective Hamiltonian $H^{(N+n=0)}$, a baseline energy $$E_0 + E_C\left(N_g - \frac{1}{2}\right)^2 + \varepsilon_C\left(n_g + \frac{1}{2}\right)^2$$

has been subtracted from the diagonal.

The effective Hamiltonian $H^{(N+n=0)}$ has an energy spectrum given by:

$$\varepsilon_{\pm} = \pm \frac{1}{2}\sqrt{\delta^2 + 4t^2}$$

The thermally averaged quantum capacitance measured by performing dispersive gate sensing on the QD 16 is given by:

$$\langle C_Q \rangle_\beta \propto \frac{e^{-\beta\varepsilon_-}\partial_{n_g}^2\varepsilon_- + e^{-\beta\varepsilon_+}\partial_{n_g}^2\varepsilon_+}{e^{-\beta\varepsilon_-} + e^{-\beta\varepsilon_+}} = -\frac{8\varepsilon_C^2 t^2}{(\delta^2 + 4t^2)^{3/2}} \tanh\left(\frac{\beta}{2}\sqrt{\delta^2 + 4t^2}\right)$$

where $$\partial_{n_g}^2\varepsilon_{\pm} = \pm\frac{(2\varepsilon_C)^2 4t^2}{2(\delta^2 + 4t^2)^{3/2}}$$

and where β is the inverse temperature. The subtracted baseline energy contributes a constant to the thermally averaged quantum capacitance $\langle C_Q \rangle_\beta$.

In the above equation for the thermally averaged quantum capacitance $\langle C_Q \rangle_\beta$, the capacitance is maximized at δ=0, the avoided crossing, which occurs when the Majorana island gate voltage $N_g$ and the QD gate voltage $n_g$ have no detuning from $$N_g = \frac{1}{2}$$

and $$n_g = \frac{-1}{2}.$$

When the thermally averaged quantum capacitance $\langle C_Q \rangle_\beta$ is maximized, $\langle C_Q \rangle_\beta$ has the following value:

$$\langle C_Q^{(N+n=0)} \rangle_\beta \propto \frac{\varepsilon_C^2}{t}\tanh(\beta t)$$

In examples in which N+n=−1, the effective Hamiltonian obtained by projecting into the low-energy subspace spanned by $|N,n\rangle = |0, -1\rangle$, $|-1,0\rangle$ is instead given by:

$$H^{(N+n=-1)} =$$

$$\begin{pmatrix} E_C\left(N_g - \frac{1}{2}\right) + \varepsilon_C\left(n_g + \frac{1}{2}\right) & t \\ t & E_C\left(2 + 3\left(N_g - \frac{1}{2}\right)\right) - \varepsilon_C\left(n_g + \frac{1}{2}\right) \end{pmatrix}$$

In the above effective Hamiltonian, the baseline energy $$E_0 + E_C\left(N_g - \frac{1}{2}\right)^2 + \varepsilon_C\left(n_g + \frac{1}{2}\right)^2$$

is again subtracted from the diagonal. The island-QD charging energy difference in the N+n=−1 case is given by:

$$\tilde{\delta} = \delta - 2E_C$$

In the N+n=−1 case, the island-dot system 11 has the following thermally averaged quantum capacitance:

$$\langle C_Q^{(N+n=-1)} \rangle_\beta \propto -\frac{8\varepsilon_C^2 t^2}{(\tilde{\delta}^2 + 4t^2)^{3/2}} \tanh\left(\frac{\beta}{2}\sqrt{\tilde{\delta}^2 + 4t^2}\right)$$

The island-dot system 11 in this example no longer has a resonance point at $$N_g = \frac{1}{2}$$

and $$n_g = \frac{-1}{2}.$$

Instead, the avoided crossing (and therefore also the resonance point) occurs at either $$N_g = \frac{-1}{2}$$

$$n_g = \frac{-1}{2}$$

or at $$N_g = \frac{1}{2}$$

$$n_g = \frac{-1}{2} + \frac{E_C}{\varepsilon_C}.$$

When the Majorana island gate voltage and the QD gate voltage are equal to $$N_g = \frac{1}{2}$$

and $$n_g = \frac{-1}{2}$$

the thermally averaged quantum capacitance is given by:

$$\left\langle C_Q^{(N+n=-1)} \right\rangle_\beta \propto -\frac{\varepsilon_C^2 t^2}{\left(E_C^2 + t^2\right)^{3/2}} \tanh\left(\beta\sqrt{E_C^2 + t^2}\right)$$

Figure 6:
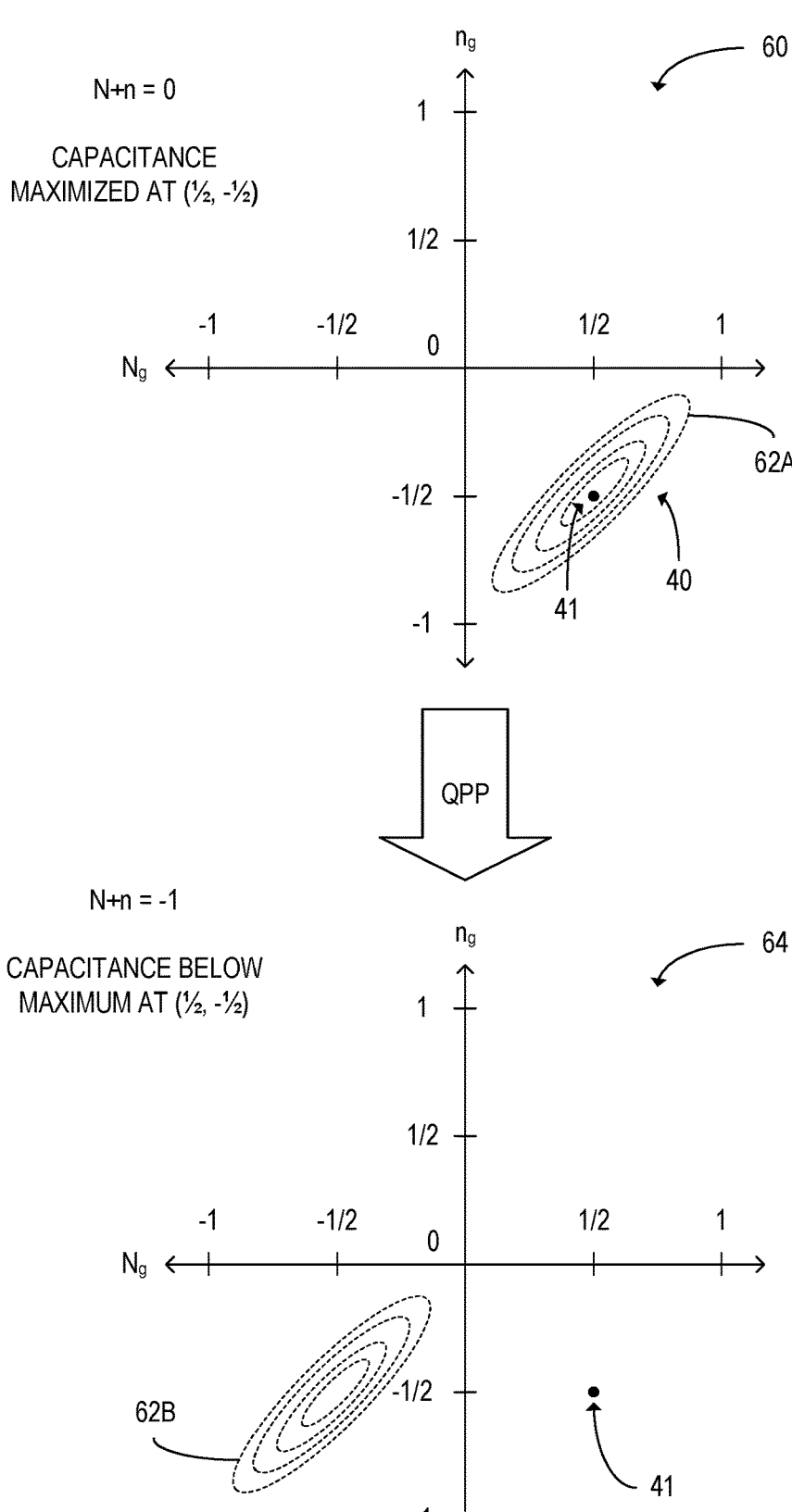
FIG. 6 shows a first example plot and a second example plot of capacitance level curves of the Majorana island and the quantum dot before and after quasiparticle poisoning occurs, according to the example of FIG. 1.

FIG. 6 shows a first example plot 60 of the Majorana island gate voltage $N_g$ and the quantum dot gate voltage $n_g$ when N+n=0, as well as a second example plot 64 of the Majorana island gate voltage $N_g$ and the quantum dot gate voltage $n_g$ when N+n=−1. The first example plot 60 and the second example plot 64 respectively include a first plurality of capacitance level curves 62A and a second plurality of capacitance level curves 62B. The first example plot 60 and the second example plot 64 also both include a candidate resonance point 41 located at $$N_g = \frac{1}{2}$$

and $$n_g = \frac{-1}{2}$$

The candidate resonance point 41 is located within a candidate resonance region 40 within which resonance is detectable via the capacitance sensor 18. In the first example plot 60, the capacitance is maximized at the candidate resonance point 41. However, when QPP occurs to change the value of N+n from 0 to −1, as shown in the example of FIG. 6, the region within which resonance occurs for the island-dot system 11 changes such that resonance no longer occurs at the candidate resonance point 41. In the second example plot 64 depicted in FIG. 6, the second capacitance level curves 62B have shifted by −1 along the $N_g$ axis relative to the first capacitance level curves 62A. Thus, the capacitance of the island-dot system 11 is below the maximum at $$N_g = \frac{1}{2}$$

and $$n_g = \frac{-1}{2}$$

The general case of resonance shifting due to QPP is discussed below. In the general case in which QPP occurs, N+n=$N_{pois}$. When $$N_{pois} \ll \frac{\varepsilon_C}{E_C},$$

the lowest energy eigenstates in the vicinity of $$N_g = \frac{1}{2}$$

$$n_g = \frac{-1}{2}$$

are $|N,n\rangle = |N_{pois}+1, -1\rangle$, $|N_{pois}, 0\rangle$, The island-QD charging energy difference is given by:

$$\tilde{\delta} = \delta + 2E_C N_{pois}$$

Thus, the avoided crossing and the resonance peak are shifted to $\delta=-2E_C N_{pois}$. For example, if the Majorana island gate voltage is fixed at $$N_g = \frac{1}{2},$$

the avoided crossing occurs when $$n_g = \frac{-1}{2} - N_{pois}\frac{E_C}{\varepsilon_C}$$

As seen above in the case where N+n=−1, the quantum capacitance $$\left\langle C_Q^{(N+n=N_{pois})} \right\rangle_\beta$$

measured in the general case is significantly suppressed at values of the Majorana island gate voltage $N_g$ and the QD gate voltage $n_g$ located away from the resonance point.

Returning to the example of FIG. 1, for each of one or more candidate resonance regions 40 corresponding to one or more candidate quasiparticle poisoning values 44, the controller 20 is configured to determine whether resonance occurs at that candidate resonance region 40. The candidate resonance regions 40 may be regions proximate to lines through a state space of values of the Majorana island gate voltage $N_g$ and the QD gate voltage $n_g$. The plurality of candidate resonance regions 40 each include a candidate resonance Majorana island voltage 42A and a candidate resonance quantum dot voltage 42B at which the controller 22 is configured to test for resonance, as discussed in further detail below. The plurality of candidate resonance regions 40 over which the controller 20 is configured to search for the resonance point are each included in an initial resonance domain 43, which includes one or more discrete values or continuous ranges of the Majorana island gate voltage $N_g$ and the QD gate voltage $n_g$. When the controller 20 determines whether resonance occurs at each of the one or more candidate resonance regions 40, the controller 20 is configured to respectively set the Majorana island gate voltage $N_g$ and the quantum dot gate voltage $n_g$ to a candidate resonance Majorana island voltage 42A and a candidate resonance quantum dot voltage 42B within the candidate resonance region 40.

The plurality of candidate resonance regions 40 correspond to respective candidate quasiparticle poisoning values 44. The candidate quasiparticle poisoning values 44 may be candidate values of $N_{pois}$ that the controller 20 is configured to check for resonance. The candidate quasiparticle poisoning values 44 may therefore be candidate values of a change in a fermion number of the Majorana island 12. For example, the one or more candidate resonance regions 40 may correspond to a set of values of the change in the fermion number equal to -2, -1, 0, 1, and 2. As another example, the controller 20 may be configured to check candidate resonance regions 40 that correspond to values of the change in the fermion number equal to -1, 0, and 1. As another example, the controller 20 may be configured to determine whether the change in the fermion number of the Majorana island 12 is equal to 0.

For each of the candidate resonance regions 40, the controller 20 is further configured to receive, via the capacitance sensor 18, a capacitance measurement 30 of the quantum dot 16 and the Majorana island 12 at the candidate resonance region 40. As discussed above, the capacitance measurement 30 may be received in the form of a microwave signal 57 output by a microwave readout circuit 56 capacitively coupled to the QD 16. The controller 20 is further configured to determine whether resonance occurs at the candidate resonance region 40 based at least in part on the capacitance measurement 30. Thus, the controller 20 is configured to compute a respective resonance determination 46 at each of the candidate resonance regions 40. The controller 20 may, for example, compute the resonance determination 46 by comparing the measured value of the quantum capacitance to the value of the quantum capacitance at the resonance peak. The value of the quantum capacitance at the resonance peak may be determined during calibration of the capacitance sensor 18 as discussed in further detail below.

Subsequently to performing the capacitance measurement 30, the controller 20 is further configured to reset the Majorana island gate voltage $N_g$ and the quantum dot gate voltage $n_g$ to the Coulomb valley Majorana island gate voltage No and the Coulomb valley quantum dot gate voltage $n_0$, respectively. The controller 20 is configured to reset the Majorana island gate voltage $N_g$ and the quantum dot gate voltage $n_g$ prior to decoupling the Majorana island 12 from the QD 16.

Subsequently to determining whether resonance occurs at the one or more candidate resonance regions 40, the controller 20 is further configured to output a quasiparticle poisoning value 48 selected from among the candidate quasiparticle poisoning values 44 as indicated by the one or more resonance determinations 46 respectively associated with the one or more candidate resonance regions 40. The quasiparticle poisoning value 48 may be a value of $N_{pois}$. Alternatively, in examples in which the controller 20 is configured to determine whether $N_{pois}=0$ without checking for resonance at other candidate resonance regions 40, the controller 20 may be configured to output a Boolean-valued quasiparticle poisoning value 48 that indicates whether quasiparticle poisoning has occurred without including a specific value of $N_{pois}$. In other examples, the quasiparticle poisoning value 48 may be a change in a fermion parity of the Majorana island 12.

Figure 7:
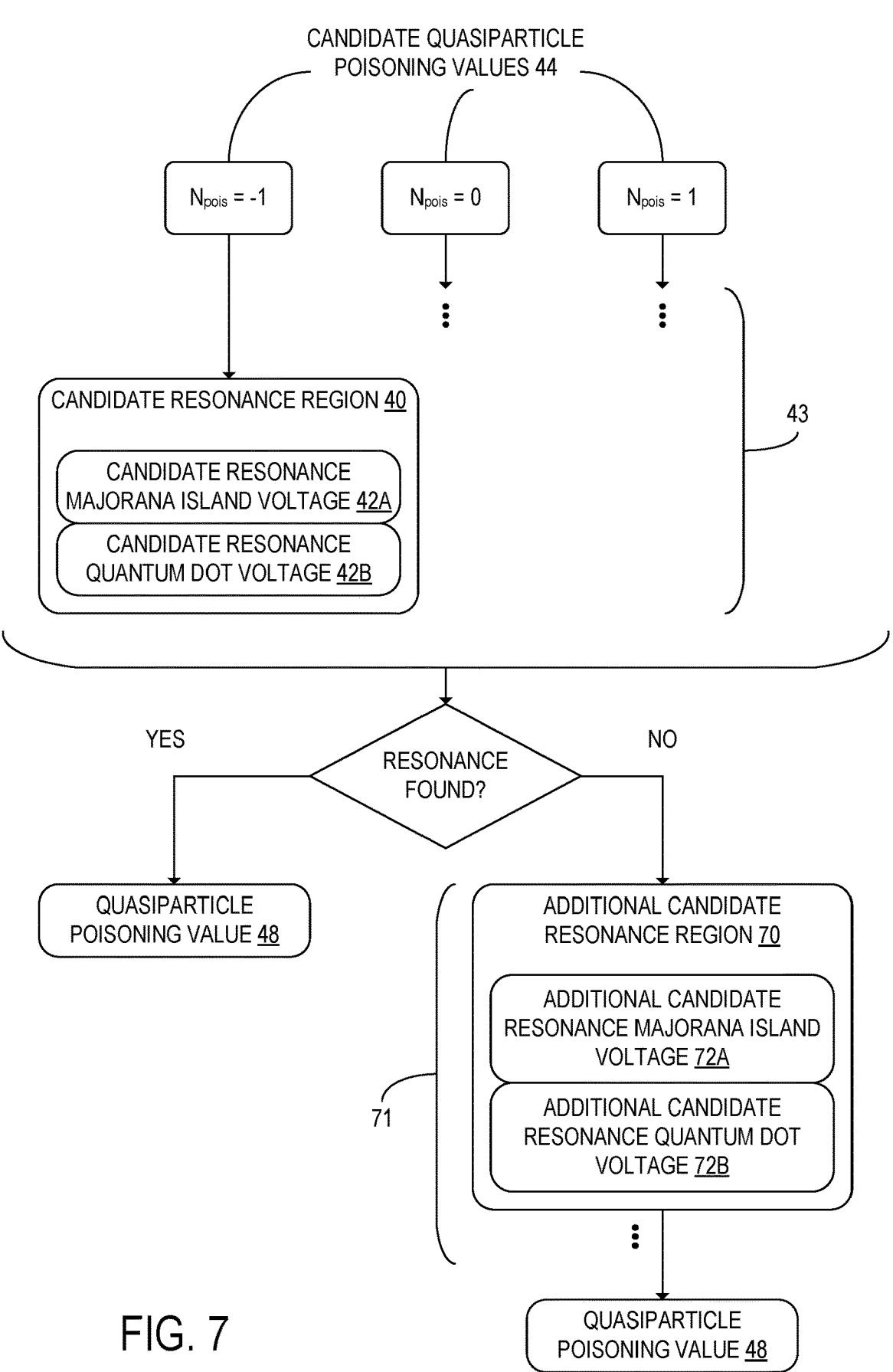
FIG. 7 schematically shows an example determination of a quasiparticle poisoning value, according to the example of FIG. 1.

FIG. 7 schematically shows an example in which the controller 20 checks for resonance at a plurality of candidate resonance regions 40. In the example of FIG. 7, the controller 20 is configured to initially check for resonance at candidate resonance regions 40 corresponding to candidate quasiparticle poisoning values 44 of $N_{pois}=-1$, $N_{pois}=0$, and $N_{pois}=1$. In examples in which resonance occurs at one of the candidate resonance regions 40, the controller 20 is configured to output the corresponding quasiparticle poisoning value 48 as discussed above.

As depicted in FIG. 7, the controller 20 may alternatively determine, based at least in part on the one or more capacitance measurements 30, that resonance does not occur in the initial resonance domain 43 within which the candidate resonance regions 40 are located. In such examples, in response to determining that resonance does not occur at any of the candidate resonance regions 40 located within the initial resonance domain 43, the controller 20 is further configured to determine whether resonance occurs at one or more additional candidate resonance regions 70 located within an extended resonance domain 71. The plurality of additional candidate resonance regions 70 each include an additional candidate resonance Majorana island voltage 72A and an additional candidate resonance quantum dot voltage 72B. In the example of FIG. 7, when the controller determines that $N_{pois}$ does not equal -1, 0, or 1, the controller 20 may be further configured to determine whether $N_{pois}$ is equal to -2 or 2. The controller 20 may be further configured to output a quasiparticle poisoning value 48 associated with an additional candidate resonance region 70 included in the extended resonance domain 71 in response to determining that resonance occurs at that additional candidate resonance region 70.

Figure 8A:
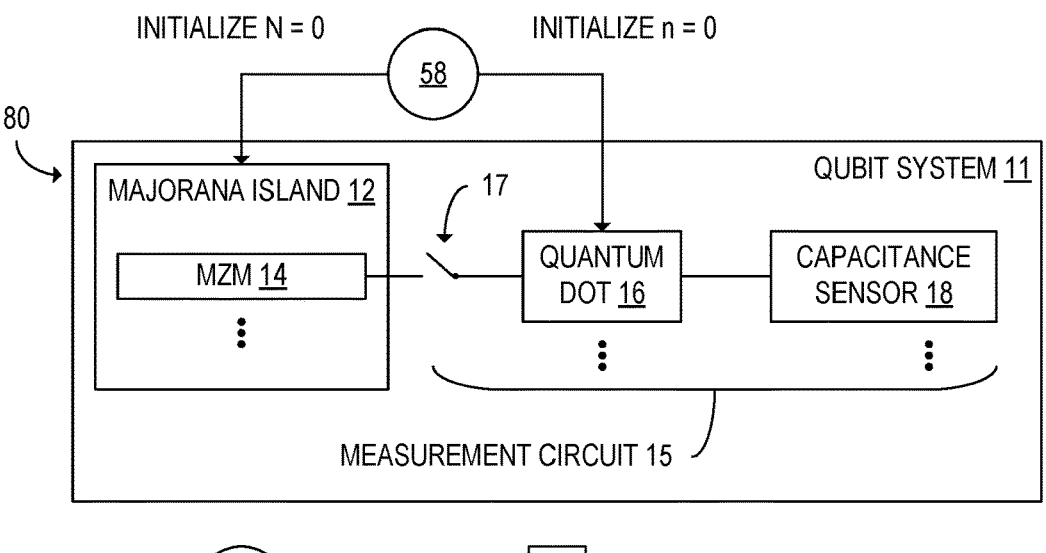
FIGS. 8A-8B schematically show the island-dot system during a calibration phase in which the controller is configured to estimate the one or more candidate resonance regions, according to the example of FIG. 1.
Figure 8A:
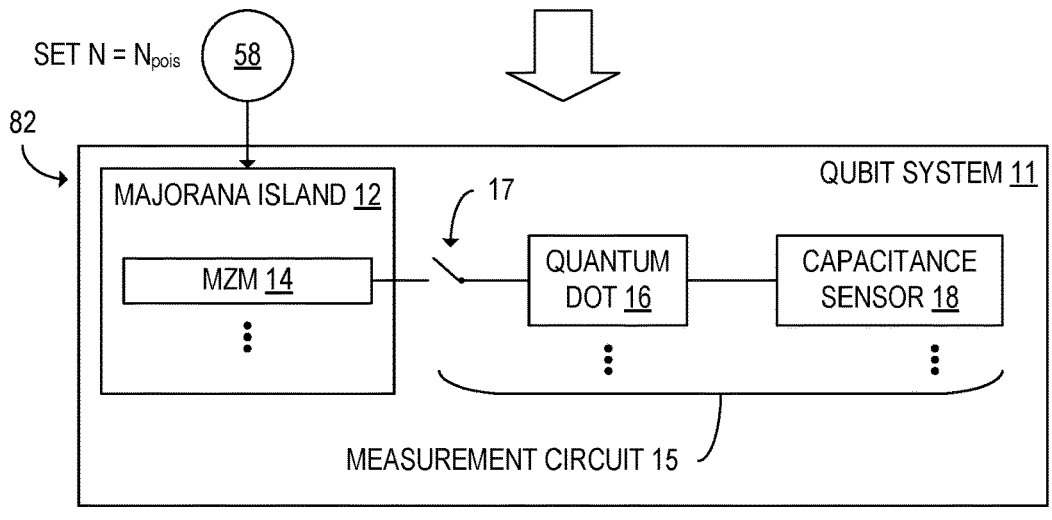
Figure 8A:
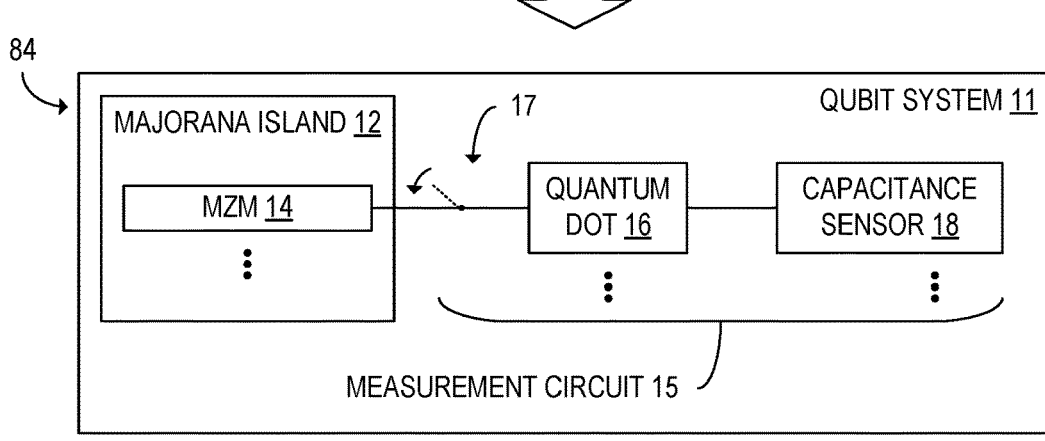
Figure 8A:
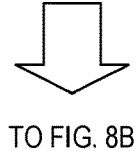
Figure 8B:
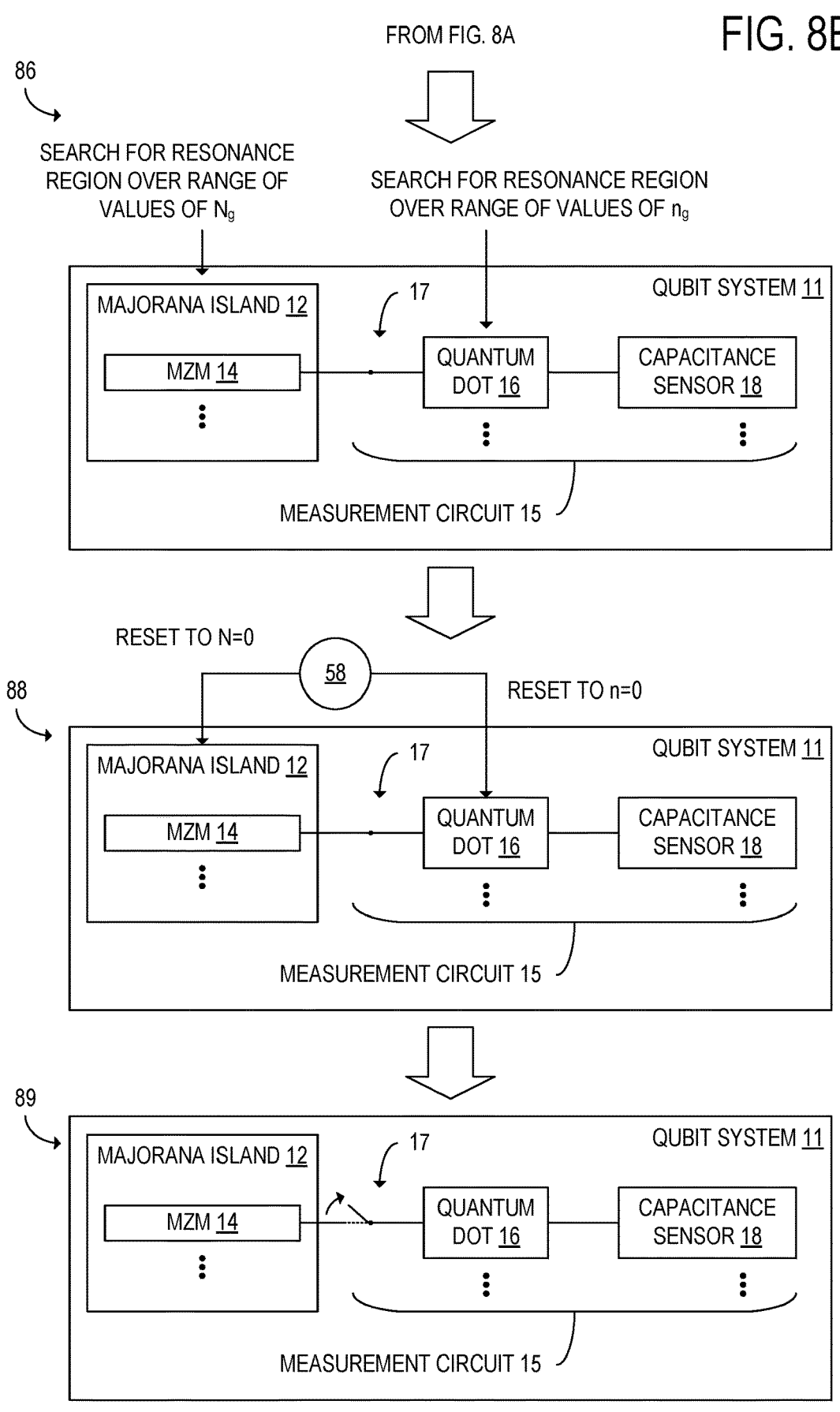

FIGS. 8A-8B schematically show the island-dot system 11 during a calibration phase in which the controller 20 is configured to estimate the locations of the one or more candidate resonance regions 40 in parameter space. FIG. 8A shows the island-dot system 11 during a first calibration step 80, a second calibration step 82, and a third calibration step 84. The calibration steps shown in FIGS. 8A-8B may be performed for each of one or more values of a change in the fermion number N of the Majorana island 12. At the first calibration step 80, the controller 20 is configured to initialize the fermion number N of the Majorana island 12 and the fermion number n of the quantum dot 16 at zero. The fermion number N of the Majorana island 12 and the fermion number n of the quantum dot 16 may be set to zero by electrically coupling the Majorana island 12 and the QD 16 to the fermion reservoir 58.

At the second calibration step 82, the controller 20 is further configured to set the fermion number N of the Majorana island 12 to the value of the change in the fermion number for which the controller 20 is currently determining the location of the candidate resonance region 40. Setting the fermion number N of the Majorana island 12 includes coupling the Majorana island 12 to the fermion reservoir 58 in the example of FIGS. 8A-8B. Thus, the controller 20 is configured to set $N_{pois}$ to a predetermined value during the second calibration step 82. In examples in which the controller determines the location of the resonance region corresponding to $N_{pois}=0$, the fermion number N of the Majorana island 12 is left unchanged in the second calibration step 82.

At the third calibration step 84, the controller 20 is further configured to electrically couple the Majorana island 12 to the quantum dot 16 by closing the switch 17. Thus, the tunnel coupling between the Majorana island 12 and the QD 16 is activated.

FIG. 8B shows the island-dot system 11 during a fourth calibration step 86, a fifth calibration step 88, and a sixth calibration step 89. At the fourth calibration step 86, the controller 20 is further configured to approximate, as the candidate resonance region 40 corresponding to the change in the fermion number, respective values of the Majorana island gate voltage $N_g$ and the quantum dot gate voltage $n_g$ at which resonance occurs. The controller 20 may be configured to approximate the Majorana island gate voltage $N_g$ and the quantum dot gate voltage $n_g$ at least in part by searching over respective ranges of the values of the Majorana island gate voltage $N_g$ and the quantum dot gate voltage $n_g$. For example, the controller 20 may be configured to perform binary searches over the respective ranges of values of the Majorana island gate voltage $N_g$ and the quantum dot gate voltage $n_g$. In this example, the controller 20 may be configured to search for values of the Majorana island gate voltage $N_g$ and the quantum dot gate voltage $n_g$ that approximate a resonance peak within the candidate resonance region 40. The controller 20 may be configured to search for the resonance values of Majorana island gate voltage $N_g$ and the quantum dot gate voltage $n_g$ separately, such that during the fourth calibration step 86, the controller 20 is configured to first identify the resonance value of one of the Majorana island gate voltage $N_g$ and the quantum dot gate voltage $n_g$ and subsequently identify the resonance value of the other.

At the fifth calibration step 88, the controller 20 is further configured to reset the Majorana island gate voltage $N_g$ and the quantum dot gate voltage $n_g$ to the Coulomb valley Majorana island gate voltage $N_0$ and the Coulomb valley quantum dot gate voltage $n_0$, respectively. In addition, the controller 20 is further configured to reset the respective fermion numbers of the Majorana island 12 and the QD 16 to N=0 and n=0 at least in part by electrically coupling the Majorana island 12 and the QD 16 to the fermion reservoir 58. At the sixth calibration step 89, the controller 20 is further configured to electrically decouple the Majorana island 12 from the quantum dot 16 by opening the switch 17. Accordingly, the tunnel coupling between the Majorana island 12 and the QD 16 is deactivated.

Figure 9:
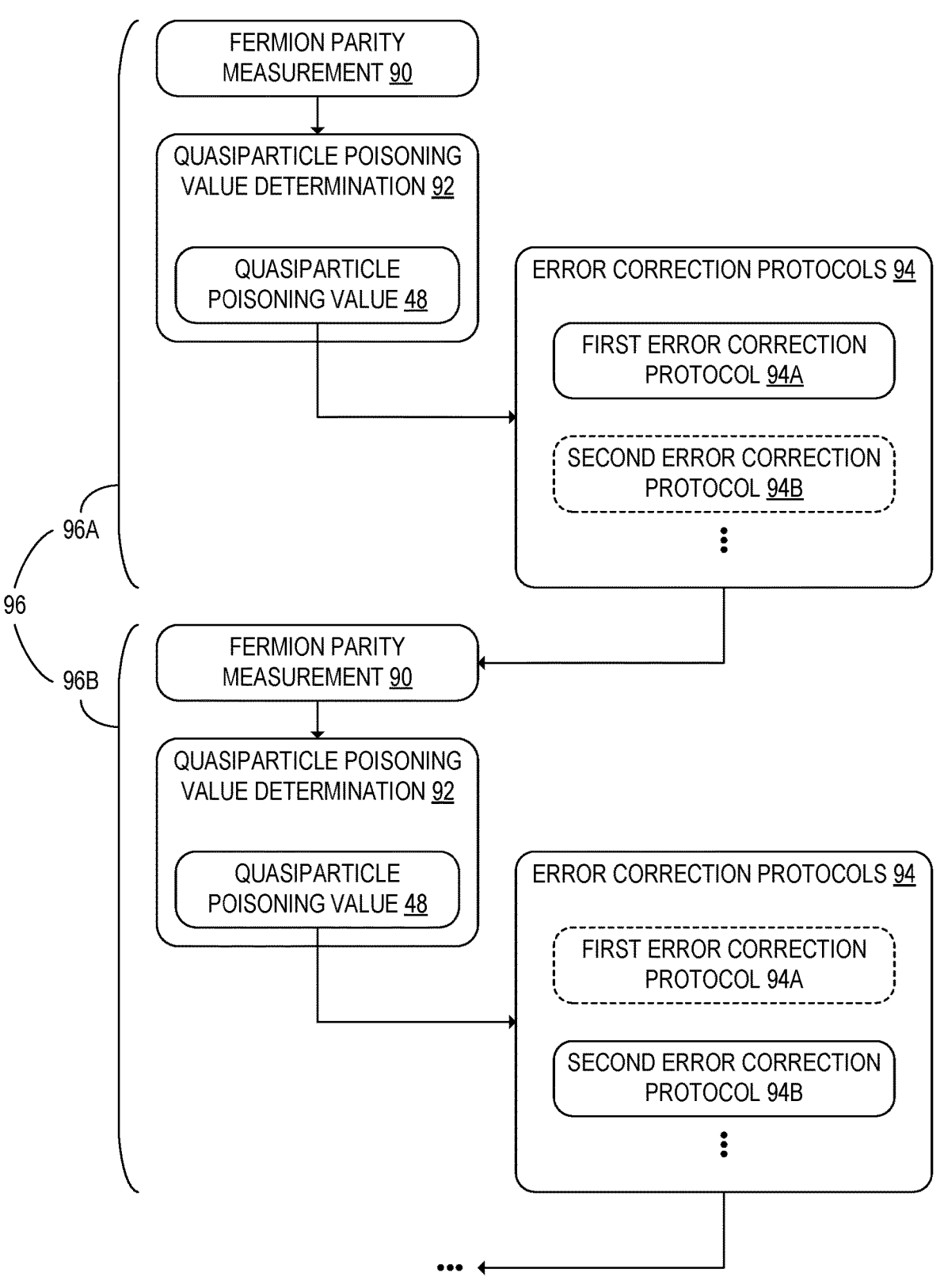
FIG. 9 schematically shows an example selection of an error correction protocol based at least in part on a quasiparticle poisoning value, according to the example of FIG. 1.

As shown in FIG. 9, according to one example, the controller 20 may be configured to compute the quasiparticle poisoning value 48 while performing a quantum computation at the quantum computing device 10. FIG. 9 schematically shows a plurality of fermion parity measurements 90 interspersed with a plurality of quasiparticle poisoning value determinations 92. In this example, in each of a plurality of quantum computation steps 96, the controller 20 is configured to determine the quasiparticle poisoning value 48 subsequently to a fermion parity measurement 90 performed at the quantum computing device 10. Thus, after each of the fermion parity measurements 90, the controller 20 is configured to determine whether QPP has occurred. Respective quasiparticle poisoning value determinations 92 may be performed for each of a plurality of island-dot systems 11 included in the quantum computing device 10.

In the example of FIG. 9, the controller 20 is further configured to select an error correction protocol 94 from among a plurality of error correction protocols 94 based at least in part on the quasiparticle poisoning value 48. The controller 20 is further configured to perform the selected error correction protocol 94 at the quantum computing device 10. As shown in the example of FIG. 9, the controller 20 selects a first error correction protocol 94A in a first quantum computation step 96A and selects a second error correction protocol 94B in a second quantum computation step 96B. In examples in which the controller 20 determines that QPP has not occurred at the island-dot system 11, the controller 20 may be configured to select an error correction protocol 94 that leaves the state of the island-dot system 11 unchanged. Performing the quasiparticle poisoning value determinations 92 at a plurality of island-dot systems 11 included in the quantum computing device 10 may allow the controller 20 to select an error correction protocol 94 that efficiently corrects errors at island-dot systems 11 where QPP has occurred, while avoiding unnecessary error correction operations that would otherwise be performed at island-dot systems 11 that did not undergo QPP.

FIG. 10A shows a flowchart of a method 100 for use with a computing system that includes a quantum computing device and a controller. The quantum computing device may include a plurality of island-dot systems that each include a Majorana island and a measurement circuit. The Majorana island includes a plurality of MZMs and may be a coherent link, a Majorana tetron, or a Majorana hexon. The measurement circuit may include a quantum dot that is capacitively coupled to a capacitance sensor. For example, the capacitance sensor may include a microwave readout circuit. The quantum dot may be electrically connectable to the Majorana island via a switch.

At step 102, the method 100 includes, for each of one or more candidate resonance regions corresponding to one or more candidate quasiparticle poisoning values of the Majorana island, determining whether resonance occurs at that candidate resonance region. The quasiparticle poisoning value may, for example, be a change in a fermion number of the Majorana island. Alternatively, the quasiparticle poisoning value may be a change in a fermion parity of the Majorana island. The one or more candidate resonance regions each include a candidate resonance Majorana island voltage and a candidate resonance quantum dot voltage at which capacitance sensing is configured to be performed. The candidate resonance Majorana island voltage and the candidate resonance quantum dot voltage are included in a candidate resonance region and accordingly are voltages at which resonance occurs at a candidate quasiparticle poisoning value corresponding to that candidate resonance region. Step 102 includes, at step 104, setting a Majorana island gate voltage of the Majorana island and a quantum dot gate voltage of the quantum dot to the candidate resonance Majorana island voltage and the candidate resonance quantum dot voltage of the candidate resonance region, respectively.

Step 102 further includes, at step 106, receiving a capacitance measurement of the quantum dot and the Majorana island at the candidate resonance region via the capacitance sensor included in the quantum computing device. The capacitance measurement is a thermally averaged quantum capacitance measurement that the capacitance sensor may, for example, be configured to obtain via dispersive gate sensing. In some examples, the capacitance measurement is obtained as an amplitude of a microwave signal output by a microwave readout circuit. The microwave readout circuit may be driven by an AC voltage source and may be an LC circuit in which the capacitance is the capacitance of the Majorana island and the quantum dot.

Step 102 further includes, at step 108, determining whether resonance occurs at the candidate resonance region based at least in part on the capacitance measurement. The resonance region of the island-dot system is a region of parameter space in which resonance is detectable from the capacitance measurement. Thus, step 108 may include determining whether the capacitance measurement at the candidate resonance region is approximately equal to a maximum capacitance value measured during calibration of the measurement circuit.

At step 110, for each of the one or more candidate resonance regions, the method 100 further includes resetting the Majorana island gate voltage and the quantum dot gate voltage to a Coulomb valley Majorana island gate voltage and a Coulomb valley quantum dot gate voltage, respectively. The Majorana island and the quantum dot may accordingly be prepared for a subsequent capacitance measurement or fermion parity measurement.

The method 100 further includes, at step 112, outputting a quasiparticle poisoning value selected from among the candidate quasiparticle poisoning values. The quasiparticle poisoning value is selected as indicated by the one or more determinations of whether resonance occurs at the one or more candidate resonance regions. In some examples, the quasiparticle poisoning value is a change in a fermion number of the Majorana island. In such examples, the one or more candidate resonance regions may correspond to a set of values of the change in the fermion number selected from among {-2, -1,0,1,2}, {-1,0,1}, and {0}. In examples in which 0 is the only value of the change in the fermion number at which the island-dot system is checked for resonance, the quasiparticle poisoning value is an indication of whether or not QPP has occurred. In other examples, the quasiparticle poisoning value is a change in a fermion parity of the Majorana island. In such examples, the quasiparticle poisoning value is an indication of whether the fermion parity of the Majorana island is even or odd.

Figure 10D:
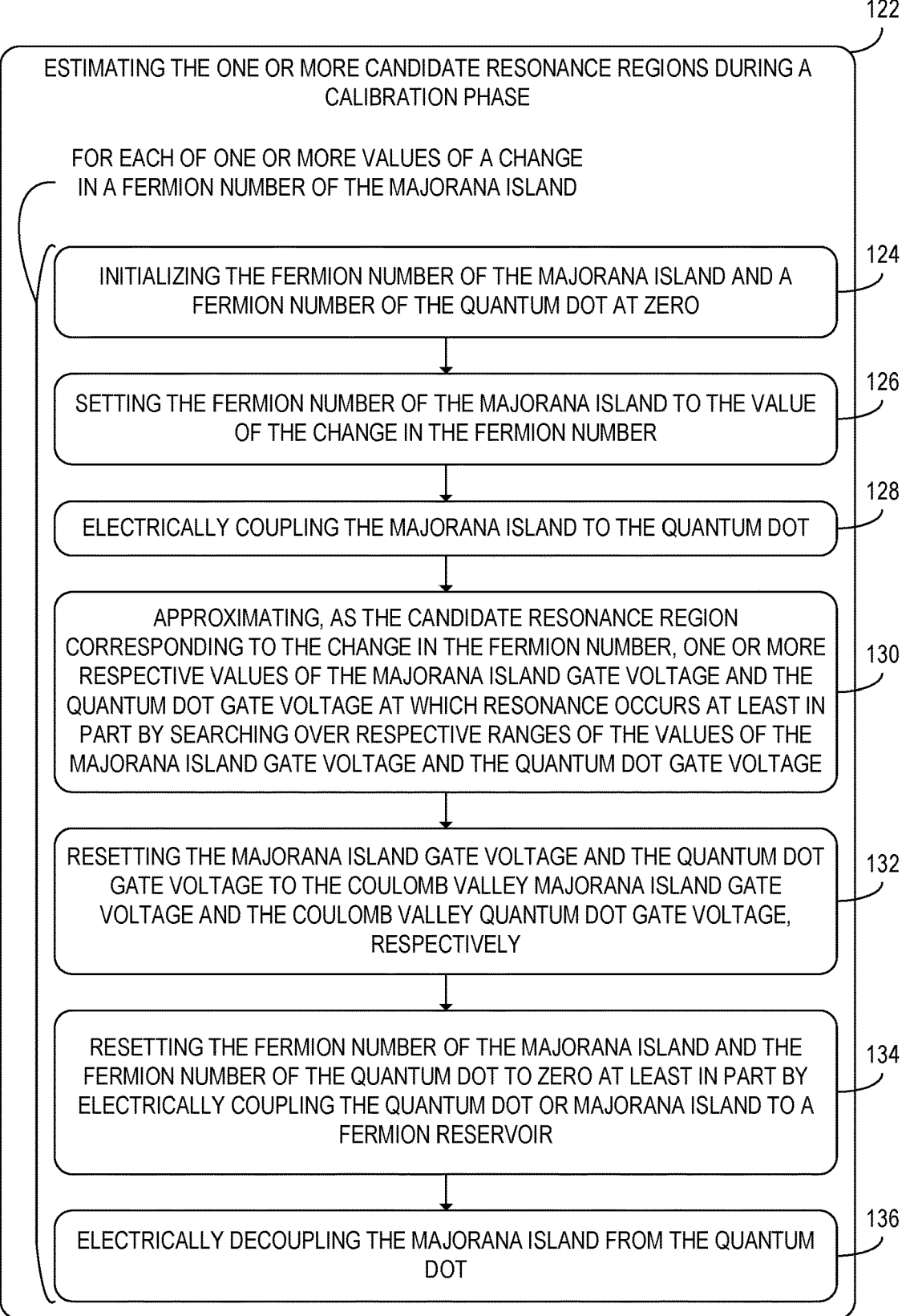

FIGS. 10B-10E show additional steps of the method 100 that may be performed in some examples. At step 114, as shown in FIG. 10B, the method 100 further includes electrically coupling the Majorana island to the quantum dot prior to performing the capacitance measurement. The Majorana island, in such examples, is coupled to the quantum dot by closing the switch located between the quantum dot and the Majorana island. At step 116, the method 100 further includes electrically decoupling the Majorana island from the quantum dot subsequently to performing the capacitance measurement. Step 116 may be performed subsequently to resetting the Majorana island gate voltage and the quantum dot gate voltage at step 110. The Majorana island is decoupled from the quantum dot by opening the switch. Thus, the Majorana island may be electrically isolated from the quantum dot and capacitance sensor when the capacitance measurement is not being performed.

In the example of FIG. 10C, the method 100 further includes, at step 118, determining that resonance does not occur in an initial resonance domain within which the candidate resonance regions are located. This determination is made based at least in part on the one or more capacitance measurements, when an estimated maximum capacitance value determined during calibration is not approximately reached within any of the candidate resonance regions. At step 120, the method 100 further includes determining whether resonance occurs at one or more additional candidate resonance regions located within an extended resonance domain. Step 120 is performed in response to determining that resonance does not occur at any of the candidate resonance regions.

In the example of FIG. 10D, the method 100 further includes, at step 122, estimating the one or more candidate resonance regions during a calibration phase. Estimating the one or more candidate resonance regions at step 122 includes steps 124, 126, 128, 130, 132 and 134, which are performed for each of one or more values of a change in a fermion number of the Majorana island. At step 124, step 122 includes initializing the fermion number of the Majorana island and a fermion number of the quantum dot at zero. At step 126, step 122 further includes setting the fermion number of the Majorana island to the value of the change in the fermion number. Step 126 may, for example, include electrically coupling the Majorana island to a fermion reservoir (e.g., an additional quantum dot). The fermion number of the quantum dot may be maintained at zero. At step

128, step 122 further includes electrically coupling the Majorana island to the quantum dot. Coupling the Majorana island to the quantum dot enables the capacitance sensor to collect capacitance measurements of the island-dot system.

At step 130, step 122 further includes approximating, as the candidate resonance region corresponding to the change in the fermion number, one or more respective values of the Majorana island gate voltage and the quantum dot gate voltage at which resonance occurs. Ranges of values of the gate voltages in which resonance occurs are estimated in some examples. The candidate resonance region is approximated at least in part by searching over respective ranges of the values of the Majorana island gate voltage and the quantum dot gate voltage for values of the Majorana island gate voltage and the quantum dot gate voltage at which the capacitance of the island-dot system is approximately maximized. For example, searching over the ranges may include performing respective binary searches over the range of Majorana island gate voltages and the range of quantum dot gate voltages. The controller accordingly estimates the resonance voltages for a value of the change in the fermion number.

At step 132, step 122 further includes resetting the Majorana island gate voltage and the quantum dot gate voltage to the Coulomb valley Majorana island gate voltage and the Coulomb valley quantum dot gate voltage, respectively. At step 134, subsequently to approximating the candidate resonance region, the method 100 further includes resetting the fermion number of the Majorana island and the fermion number of the quantum dot to zero at least in part by electrically coupling the quantum dot of the Majorana island to the fermion reservoir.

At step 136, step 122 further includes electrically decoupling the Majorana island from the quantum dot. Step 122 may return to step 126 subsequently to step 130. Thus, at steps 132, 134, and 136, the island-dot system may be prepared for calibration at another value of the change in the fermion number.

FIG. 10E shows additional steps of the method 100 that may be performed when a fermion parity measurement is performed at the island-dot system. The fermion parity measurement may be performed as part of a quantum computation. At step 138, the method 100 may further include, via the quantum dot, performing a parity measurement of a plurality of MZMs that includes the MZM to which the quantum dot is electrically coupled. In such examples, since the quantum dot may be used for performing both the Majorana island fermion number measurement and the MZM fermion parity measurement, the quantum dot serves a dual purpose, thereby allowing the size and complexity of the island-dot system to be reduced. Alternatively, at step 140, the method 100 may further include performing the fermion parity measurement of the plurality of MZMs that includes the MZM to which the quantum dot is electrically coupled via an additional quantum dot.

At step 142, the method 100 further includes determining the quasiparticle poisoning value subsequently to a fermion parity measurement performed at the quantum computing device. Thus, the Majorana island is tested for QPP subsequently to performing the fermion parity measurement involving an MZM from that island.

At step 144, the method 100 further includes selecting an error correction protocol from among a plurality of error correction protocols based at least in part on the quasiparticle poisoning value. In examples in which the controller determines that QPP has not occurred at the Majorana island, step 144 may include selecting an error correction protocol that leaves the fermion number of the Majorana island unchanged. In examples in which the controller determines that QPP has occurred at the Majorana island, step 144 may include selecting an error correction protocol that corrects a qubit state of the Majorana island. At step 146, the method 100 further includes performing the selected error correction protocol at the quantum computing device.

Using the devices and methods discussed above, a controller is configured to detect quasiparticle poisoning at a Majorana island included in a quantum computing device. This detection may, for example, be performed when selecting an error correction protocol, and may accordingly allow the quantum computing device to correct errors in a more focused and efficient manner. In addition, the quasiparticle poisoning detection techniques discussed above may be performed without introducing additional components into the quantum computing device beyond those that are used to perform fermion parity measurements. Thus, the above devices and methods may allow the controller of the quantum computing device to detect quasiparticle poisoning without increasing the hardware complexity of the quantum computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
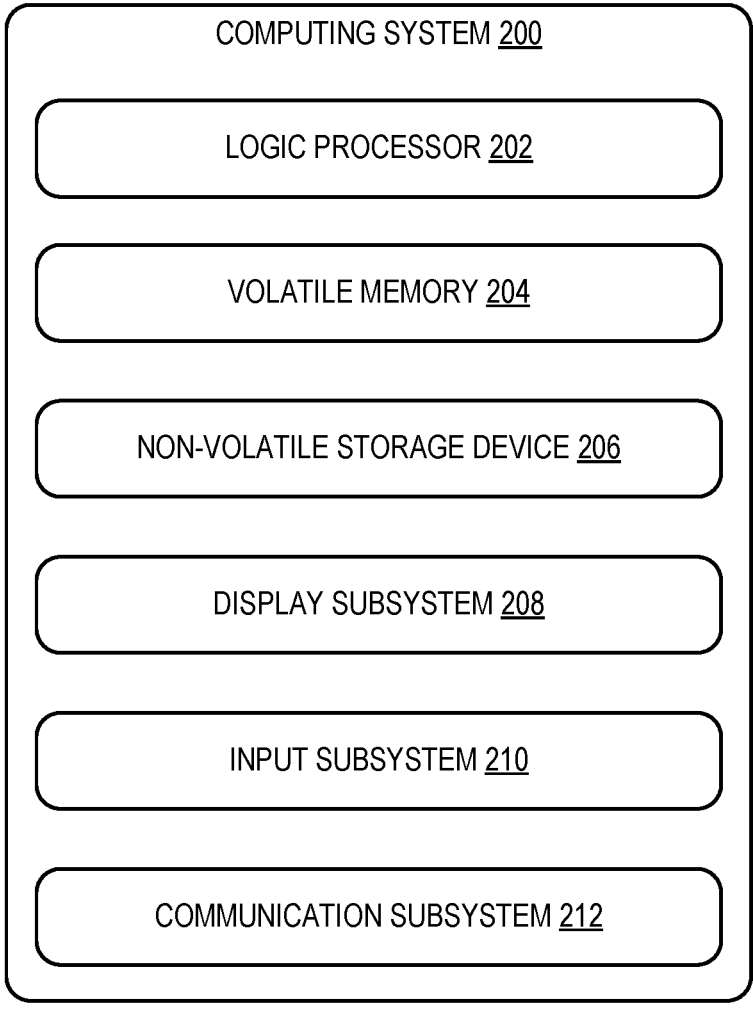
FIG. 11 shows a schematic view of an example computing environment in which the computing system of FIG. 1 may be instantiated.

FIG. 11 schematically shows a non-limiting embodiment of a computing system 200 that can enact one or more of the methods and processes described above. Computing system 200 is shown in simplified form. Computing system 200 may embody the computing system 1 described above and illustrated in FIG. 1. Components of the computing system 200 may be instantiated in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 11.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 200 to send and/or receive messages to and/or from other devices via a network such as the Internet.

The following paragraphs discuss several aspects of the present disclosure. According to one aspect, a computing system is provided, including a quantum computing device. The quantum computing device includes a Majorana island at which a plurality of Majorana zero modes (MZMs) are instantiated. The quantum computing device further includes a quantum dot electrically connectable to an MZM of the plurality of MZMs. The quantum computing device further includes a capacitance sensor capacitively coupled to the quantum dot. The quantum computing device further includes a controller configured to, for each of one or more candidate resonance regions corresponding to one or more candidate quasiparticle poisoning values, determine whether resonance occurs at that candidate resonance region. The controller is configured to determine whether resonance occurs at least in part by setting a Majorana island gate voltage of the Majorana island and a quantum dot gate voltage of the quantum dot to a candidate resonance Majorana island voltage and a candidate resonance quantum dot voltage of the candidate resonance region, respectively. Determining whether resonance occurs further includes, via the capacitance sensor, receiving a capacitance measurement of the quantum dot and the Majorana island at the candidate resonance region. The controller is further configured to determine whether resonance occurs at the candidate resonance region based at least in part on the capacitance measurement. The controller is further configured to reset the Majorana island gate voltage and the quantum dot gate voltage to a Coulomb valley Majorana island gate voltage and a Coulomb valley quantum dot gate voltage, respectively. The controller is further configured to output a quasiparticle poisoning value selected from among the candidate quasiparticle poisoning values as indicated by the one or more determinations of whether resonance occurs at the one or more candidate resonance regions. The above features may have the technical effect of detecting whether quasiparticle poisoning has occurred at the quantum computing device.

According to this aspect, wherein the Majorana island may be a coherent link, a Majorana tetron, or a Majorana hexon. The above features may have the technical effect of allowing a bit or qubit to be instantiated at the Majorana island.

According to this aspect, the quasiparticle poisoning value may be a change in a fermion number of the Majorana island. The above feature may have the technical effect of allowing the controller to distinguish between quasiparticle poisoning events in which different numbers of fermions are transferred.

According to this aspect, the one or more candidate resonance regions may correspond to a set of values of the change in the fermion number selected from the group consisting of $-2$, $-1$, $0$, $1$, and $2$; $-1$, $0$, and $1$; and $0$. The above features may have the technical effect of allowing the controller to detect frequently occurring changes in the fermion number.

According to this aspect, the controller may be further configured to determine, based at least in part on the one or more capacitance measurements, that resonance does not occur in an initial resonance domain within which the candidate resonance regions are located. The controller may be further configured to determine whether resonance occurs at one or more additional candidate resonance regions located within an extended resonance domain in response to determining that resonance does not occur at any of the candidate resonance regions. The above features may have the technical effect of searching for resonance at more likely candidate resonance regions before less likely candidate resonance regions.

According to this aspect, the quasiparticle poisoning value may be a change in a fermion parity of the Majorana island. The above feature may have the technical effect of allowing the controller to detect changes in the parity of the Majorana island.

According to this aspect, the controller may be further configured to electrically couple the Majorana island to the quantum dot prior to performing the capacitance measurement. The controller may be further configured to electrically decouple the Majorana island from the quantum dot subsequently to performing the capacitance measurement. The above features may have the technical effect of coupling the Majorana island to the quantum dot specifically during capacitance measurements without having the Majorana island coupled to the quantum dot during MZM parity measurements.

According to this aspect, the controller may be further configured to estimate the one or more candidate resonance regions during a calibration phase at least in part by, for each of one or more values of a change in a fermion number of the Majorana island, initializing the fermion number of the Majorana island and a fermion number of the quantum dot at zero. The calibration phase may further include setting the fermion number of the Majorana island to the value of the change in the fermion number. The calibration phase may further include electrically coupling the Majorana island to the quantum dot. The calibration phase may further include approximating, as the candidate resonance region corresponding to the change in the fermion number, one or more respective values of the Majorana island gate voltage and the quantum dot gate voltage at which resonance occurs at least in part by searching over respective ranges of the values of the Majorana island gate voltage and the quantum dot gate voltage. The calibration phase may further include resetting the Majorana island gate voltage and the quantum dot gate voltage to the Coulomb valley Majorana island gate voltage and the Coulomb valley quantum dot gate voltage, respectively. The calibration phase may further include electrically decoupling the Majorana island from the quantum dot. The above features may have the technical effect of identifying the parameter-space regions at which resonance occurs for each of the candidate quasiparticle poisoning values.

According to this aspect, for each of the one or more values of the change in the fermion number, subsequently to approximating the candidate resonance region, the calibration phase may further include resetting the fermion number of the Majorana island and the fermion number of the quantum dot to zero at least in part by electrically coupling the quantum dot or Majorana island to a fermion reservoir. The above features may have the technical effect of preparing the Majorana island and the quantum dot for identification of one or more additional candidate resonance regions during the calibration phase.

According to this aspect, via the quantum dot, the quantum computing device may be further configured to perform a fermion parity measurement of a plurality of MZMs that includes the MZM to which the quantum dot is electrically coupled. The above features may have the technical effect of reducing the number of components of the quantum computing device by using the quantum dot for both quasiparticle poisoning detection and parity measurement.

According to this aspect, via an additional quantum dot, the quantum computing device may be further configured to perform a fermion parity measurement of a plurality of MZMs that includes the MZM to which the quantum dot is electrically coupled. The above features may have the technical effect of allowing different sizes of quantum dots to be used for parity measurements and quasiparticle poisoning detection.

According to this aspect, wherein the controller may be further configured to determine the quasiparticle poisoning value subsequently to a fermion parity measurement performed at the quantum computing device. The controller may be further configured to select an error correction protocol from among a plurality of error correction protocols based at least in part on the quasiparticle poisoning value. The controller may be further configured to perform the selected error correction protocol at the quantum computing device. The above features may have the technical effect of selecting an error correction protocol that is suitable to the detected quasiparticle poisoning value.

According to this aspect, the capacitance sensor may include a microwave readout circuit configured to generate a microwave signal based at least in part on a capacitance of the quantum dot and the Majorana island. The above features may have the technical effect of allowing the controller to identify resonance based on the microwave signal output by the microwave readout circuit.

According to another aspect of the present disclosure, a method for use with a computing system is provided. The method includes, for each of one or more candidate resonance regions corresponding to one or more candidate quasiparticle poisoning values of a Majorana island included in a quantum computing device, determining whether resonance occurs at that candidate resonance region. Determining whether resonance occurs includes setting a Majorana island gate voltage of the Majorana island and a quantum dot gate voltage of the quantum dot to a candidate resonance Majorana island voltage and a candidate resonance quantum dot voltage of the candidate resonance region, respectively.

Determining whether resonance occurs further includes, via a capacitance sensor included in the quantum computing device, receiving a capacitance measurement of the quantum dot and the Majorana island at the candidate resonance region. The method further includes determining whether resonance occurs at the candidate resonance region based at least in part on the capacitance measurement. The method further includes resetting the Majorana island gate voltage and the quantum dot gate voltage to a Coulomb valley Majorana island gate voltage and a Coulomb valley quantum dot gate voltage, respectively. The method further includes outputting a quasiparticle poisoning value selected from among the candidate quasiparticle poisoning values as indicated by the one or more determinations of whether resonance occurs at the one or more candidate resonance regions. The above features may have the technical effect of detecting whether quasiparticle poisoning has occurred at the quantum computing device.

According to this aspect, wherein the Majorana island may be a coherent link, a Majorana tetron, or a Majorana hexon. The above features may have the technical effect of allowing a bit or qubit to be instantiated at the Majorana island.

According to this aspect, the quasiparticle poisoning value may be a change in a fermion number of the Majorana island. The above feature may have the technical effect of allowing the controller to distinguish between quasiparticle poisoning events in which different numbers of fermions are transferred.

According to this aspect, the one or more candidate resonance regions may correspond to a set of values of the change in the fermion number selected from the group consisting of $-2$, $-1$, $0$, $1$, and $2$; $-1$, $0$, and $1$; and $0$. The above features may have the technical effect of allowing the controller to detect frequently occurring changes in the fermion number.

According to this aspect, the method may further include electrically coupling the Majorana island to the quantum dot prior to performing the capacitance measurement. The method may further include electrically decoupling the Majorana island from the quantum dot subsequently to performing the capacitance measurement. The above features may have the technical effect of coupling the Majorana island to the quantum dot specifically during capacitance measurements without having the Majorana island coupled to the quantum dot during MZM parity measurements.

According to this aspect, the method may further include further comprising estimating the one or more candidate resonance regions during a calibration phase at least in part by, for each of one or more values of a change in a fermion number of the Majorana island, initializing the fermion number of the Majorana island and a fermion number of the quantum dot at zero. The calibration phase may further include setting the fermion number of the Majorana island to the value of the change in the fermion number. The calibration phase may further include electrically coupling the Majorana island to the quantum dot. The calibration phase may further include approximating, as the candidate resonance region corresponding to the change in the fermion number, one or more respective values of the Majorana island gate voltage and the quantum dot gate voltage at which resonance occurs at least in part by searching over respective ranges of the values of the Majorana island gate voltage and the quantum dot gate voltage. The calibration phase may further include resetting the Majorana island gate voltage and the quantum dot gate voltage to the Coulomb valley Majorana island gate voltage and the Coulomb valley quantum dot gate voltage, respectively. The calibration phase may further include electrically decoupling the Majorana island from the quantum dot. The above features may have the technical effect of identifying the parameter-space regions at which resonance occurs for each of the candidate quasiparticle poisoning values.

According to another aspect of the present disclosure, a computing system is provided, including a quantum computing device. The quantum computing device includes a Majorana island at which a plurality of Majorana zero modes (MZMs) are instantiated. The quantum computing device further includes a quantum dot electrically connectable to an MZM of the plurality of MZMs. The quantum computing device further includes a capacitance sensor capacitively coupled to the quantum dot. The quantum computing device further includes a controller configured to, for each of one or more candidate resonance regions corresponding to one or more candidate values of a change in a fermion number of the Majorana island, set a Majorana island gate voltage of the Majorana island and a quantum dot gate voltage of the quantum dot to a candidate resonance Majorana island voltage and a candidate resonance quantum dot voltage of the candidate resonance region, respectively. Via the capacitance sensor, the controller is further configured to receive a capacitance measurement of the quantum dot and the Majorana island at the candidate resonance region. The controller is further configured to determine whether resonance occurs at the candidate resonance region based at least in part on the capacitance measurement. The controller is further configured to output the determination of whether resonance occurs at the candidate resonance region. The above features may have the technical effect of detecting whether quasiparticle poisoning has occurred at the quantum computing device.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a quantum computing device including:
    a Majorana island at which a plurality of Majorana zero modes (MZMs) are instantiated;
    a quantum dot electrically connectable to an MZM of the plurality of MZMs; and
    a capacitance sensor capacitively coupled to the quantum dot; and
a controller configured to:
    for each of one or more candidate resonance regions corresponding to one or more candidate quasiparticle poisoning values:
        determine whether resonance occurs at that candidate resonance region at least in part by:
            setting a Majorana island gate voltage of the Majorana island and a quantum dot gate voltage of the quantum dot to a candidate resonance Majorana island voltage and a candidate resonance quantum dot voltage of the candidate resonance region, respectively;
            via the capacitance sensor, receiving a capacitance measurement of the quantum dot and the Majorana island at the candidate resonance region; and
            determining whether resonance occurs at the candidate resonance region based at least in part on the capacitance measurement; and
        reset the Majorana island gate voltage and the quantum dot gate voltage to a Coulomb valley Majorana island gate voltage and a Coulomb valley quantum dot gate voltage, respectively; and
    output a quasiparticle poisoning value selected from among the candidate quasiparticle poisoning values as indicated by the one or more determinations of whether resonance occurs at the one or more candidate resonance regions.

2. The computing system of claim 1, wherein the Majorana island is a coherent link, a Majorana tetron, or a Majorana hexon.

3. The computing system of claim 1, wherein the quasiparticle poisoning value is a change in a fermion number of the Majorana island.

4. The computing system of claim 3, wherein the one or more candidate resonance regions correspond to a set of values of the change in the fermion number selected from the group consisting of:
    −2, −1, 0, 1, and 2;
    −1, 0, and 1; and
    0.

5. The computing system of claim 3, wherein the controller is further configured to:
    determine, based at least in part on the one or more capacitance measurements, that resonance does not occur in an initial resonance domain within which the candidate resonance regions are located;
    in response to determining that resonance does not occur at any of the candidate resonance regions, determine whether resonance occurs at one or more additional candidate resonance regions located within an extended resonance domain.

6. The computing system of claim 1, wherein the quasiparticle poisoning value is a change in a fermion parity of the Majorana island.

7. The computing system of claim 1, wherein the controller is further configured to:
    electrically couple the Majorana island to the quantum dot prior to performing the capacitance measurement; and
    electrically decouple the Majorana island from the quantum dot subsequently to performing the capacitance measurement.

8. The computing system of claim 1, wherein the controller is further configured to estimate the one or more candidate resonance regions during a calibration phase at least in part by, for each of one or more values of a change in a fermion number of the Majorana island:

initializing the fermion number of the Majorana island and a fermion number of the quantum dot at zero;

setting the fermion number of the Majorana island to the value of the change in the fermion number;

electrically coupling the Majorana island to the quantum dot;

approximating, as the candidate resonance region corresponding to the change in the fermion number, one or more respective values of the Majorana island gate voltage and the quantum dot gate voltage at which resonance occurs at least in part by searching over respective ranges of the values of the Majorana island gate voltage and the quantum dot gate voltage;

resetting the Majorana island gate voltage and the quantum dot gate voltage to the Coulomb valley Majorana island gate voltage and the Coulomb valley quantum dot gate voltage, respectively; and electrically decoupling the Majorana island from the quantum dot.

9. The computing system of claim 8, wherein, for each of the one or more values of the change in the fermion number, subsequently to approximating the candidate resonance region, the calibration phase further includes resetting the fermion number of the Majorana island and the fermion number of the quantum dot to zero at least in part by electrically coupling the quantum dot or Majorana island to a fermion reservoir.

10. The computing system of claim 1, wherein, via the quantum dot, the quantum computing device is further configured to perform a fermion parity measurement of a plurality of MZMs that includes the MZM to which the quantum dot is electrically coupled.

11. The computing system of claim 1, wherein, via an additional quantum dot, the quantum computing device is further configured to perform a fermion parity measurement of a plurality of MZMs that includes the MZM to which the quantum dot is electrically coupled.

12. The computing system of claim 1, wherein the controller is further configured to:

determine the quasiparticle poisoning value subsequently to a fermion parity measurement performed at the quantum computing device;

select an error correction protocol from among a plurality of error correction protocols based at least in part on the quasiparticle poisoning value; and perform the selected error correction protocol at the quantum computing device.

13. The computing system of claim 1, wherein the capacitance sensor includes a microwave readout circuit configured to generate a microwave signal based at least in part on a capacitance of the quantum dot and the Majorana island.

14. A method for use with a computing system, the method comprising:

for each of one or more candidate resonance regions corresponding to one or more candidate quasiparticle poisoning values of a Majorana island included in a quantum computing device:

determining whether resonance occurs at that candidate resonance region at least in part by:

setting a Majorana island gate voltage of the Majorana island and a quantum dot gate voltage of the quantum dot to a candidate resonance Majorana island voltage and a candidate resonance quantum dot voltage of the candidate resonance region, respectively;

via a capacitance sensor included in the quantum computing device, receiving a capacitance measurement of the quantum dot and the Majorana island at the candidate resonance region; and determining whether resonance occurs at the candidate resonance region based at least in part on the capacitance measurement; and resetting the Majorana island gate voltage and the quantum dot gate voltage to a Coulomb valley Majorana island gate voltage and a Coulomb valley quantum dot gate voltage, respectively; and outputting a quasiparticle poisoning value selected from among the candidate quasiparticle poisoning values as indicated by the one or more determinations of whether resonance occurs at the one or more candidate resonance regions.

15. The method of claim 14, wherein the Majorana island is a coherent link, a Majorana tetron, or a Majorana hexon.

16. The method of claim 14, wherein the quasiparticle poisoning value is a change in a fermion number of the Majorana island.

17. The method of claim 16, wherein the one or more candidate resonance regions correspond to a set of values of the change in the fermion number selected from the group consisting of:

$-2, -1, 0, 1,$ and $2$;

$-1, 0,$ and $1$; and $0$.

18. The method of claim 14, further comprising:

electrically coupling the Majorana island to the quantum dot prior to performing the capacitance measurement; and electrically decoupling the Majorana island from the quantum dot subsequently to performing the capacitance measurement.

19. The method of claim 14, further comprising estimating the one or more candidate resonance regions during a calibration phase at least in part by, for each of one or more values of a change in a fermion number of the Majorana island:

initializing the fermion number of the Majorana island and a fermion number of the quantum dot at zero;

setting the fermion number of the Majorana island to the value of the change in the fermion number;

electrically coupling the Majorana island to the quantum dot;

approximating, as the candidate resonance region corresponding to the change in the fermion number, one or more respective values of the Majorana island gate voltage and the quantum dot gate voltage at which resonance occurs at least in part by searching over respective ranges of the values of the Majorana island gate voltage and the quantum dot gate voltage;

resetting the Majorana island gate voltage and the quantum dot gate voltage to the Coulomb valley Majorana island gate voltage and the Coulomb valley quantum dot gate voltage, respectively; and electrically decoupling the Majorana island from the quantum dot.

20. A computing system comprising:

a quantum computing device including:

a Majorana island at which a plurality of Majorana zero modes (MZMs) are instantiated;

a quantum dot electrically connectable to an MZM of the plurality of MZMs; and a capacitance sensor capacitively coupled to the quantum dot; and a controller configured to, for each of one or more candidate resonance regions corresponding to one or more candidate values of a change in a fermion number of the Majorana island:

set a Majorana island gate voltage of the Majorana island and a quantum dot gate voltage of the quantum dot to a candidate resonance Majorana island voltage and a candidate resonance quantum dot voltage of the candidate resonance region, respectively;

via the capacitance sensor, receive a capacitance measurement of the quantum dot and the Majorana island at the candidate resonance region; and determine whether resonance occurs at the candidate resonance region based at least in part on the capacitance measurement; and output the determination of whether resonance occurs at the candidate resonance region.

* * * * *